(12) United States Patent
Beck et al.

(10) Patent No.: US 7,240,850 B2
(45) Date of Patent: Jul. 10, 2007

(54) THERMOSTATIC MIXING VALVE

(75) Inventors: Nicholas John Beck, Tewkesbury (GB); Sean Patrick Conway, Cranham (GB); Bruce Lewin John Hayward, Cheltenham (GB); Kevin Taylor Peel, Abbeymead (GB)

(73) Assignee: Kohler Mira Limited, Gloucestershire (GB)

( * ) Notice: Subject to any disclaimer, the term of this patent is extended or adjusted under 35 U.S.C. 154(b) by 0 days.

(21) Appl. No.: 10/607,025

(22) Filed: Jun. 26, 2003

(65) Prior Publication Data

US 2004/0000594 A1   Jan. 1, 2004

(30) Foreign Application Priority Data

| Jun. 26, 2002 | (GB) | ................................. 0214716.3 |
| Jun. 26, 2002 | (GB) | ................................. 0214717.1 |
| Jun. 26, 2002 | (GB) | ................................. 0214720.5 |

(51) Int. Cl.
  *G05D 23/12*   (2006.01)
(52) U.S. Cl. .................................. 236/12.2; 137/625.4
(58) Field of Classification Search ............... 236/12.1, 236/12.2, 12.19, 12.21; 137/625.4
  See application file for complete search history.

(56) References Cited

U.S. PATENT DOCUMENTS 3,061,195 A * 10/1962 Bowman .................... 236/12.2
3,827,016 A * 7/1974 Knapp ........................ 236/12.2
5,379,936 A * 1/1995 Kline ......................... 236/12.2
5,927,597 A * 7/1999 Bolgar et al. ............... 236/12.2
6,079,625 A    6/2000 Lebkuchner ................ 236/12.2
6,325,295 B1 * 12/2001 Lorch ......................... 236/12.2
6,454,175 B1 * 9/2002 Lorch ......................... 236/12.2
6,517,006 B1 * 2/2003 Knapp ........................ 236/12.2
6,575,377 B1 * 6/2003 Graves ....................... 236/12.2

FOREIGN PATENT DOCUMENTS

| CH | 400 695 | 4/1966 |
| DE | 1 206 241 | 12/1965 |
| DE | 2 014 552 | 12/1971 |
| DE | 38 00 305 C1 | 3/1989 |
| DE | 297 05 145 U1 | 6/1997 |
| FR | 2 569 815 | 3/1986 |
| GB | 1 039 162 | 8/1966 |
| GB | 1 352 917 | 5/1974 |
| GB | 2 213 566 A | 8/1989 |
| GB | 2 329 691 A | 3/1999 |
| WO | WO 79/00313 | 6/1979 |
| WO | WO 94/15125 | 7/1994 |
| WO | WO 00/52545 | 9/2000 |
| WO | WO 01/02923 A1 | 1/2001 |

* cited by examiner

*Primary Examiner*—William E. Tapolcai
(74) *Attorney, Agent, or Firm*—Greer, Burns & Crain, Ltd.

(57) ABSTRACT

A thermostatic mixing valve for hot and cold water has two-stage inlet chambers for the hot and cold water flows respectively. The inlet chambers distribute the flows uniformly with respect to porting for admitting the flows to the mixing chamber to reduce asymmetric flow patterns and promote thorough mixing of the flows within the mixing chamber.

22 Claims, 20 Drawing Sheets

THERMOSTATIC MIXING VALVE

FIELD OF THE INVENTION

This invention concerns improvements in or relating to thermostatic mixing valves. The invention has particular, but not exclusive, application to thermostatic mixing valves for water supply installations such as showers.

BACKGROUND OF THE INVENTION

Thermostatic mixing valves provide a source of water having a desired temperature and are operable to maintain the desired water temperature substantially constant. Typically, the desired water temperature is obtained by controlling the relative proportions of hot and cold water admitted to a mixing chamber and adjusting the relative proportions to maintain the desired water temperature substantially constant.

The known thermostatic mixing valves employ an actuator responsive to water temperature for adjusting the relative proportions in which the hot and cold water are mixed to maintain the desired water temperature substantially constant. Various types of actuators for providing the thermal control of the water temperature are known including thermally responsive elements positioned in the water flow for actuating the valve in response to the detected water temperature. For example, wax capsules or bimetal or memory metal type actuators. Alternatively, a motor may be provided to actuate the valve in response to the water temperature detected by temperature sensors.

In use, the outlet water temperature can deviate from the desired temperature if the temperature and/or pressure of one or both of the hot and cold water supplies to the mixing valve changes. A sudden increase or decrease in temperature that is sufficient to be discernible to the user may result in an uncomfortable experience. As a result, steady state temperature performance requirements are becoming increasingly more stringent with reductions in the permitted temperature deviations being introduced. For example, in mixing valves for healthcare applications such as in hospitals or care homes for the elderly or disabled, temperature deviations of only a few degrees are permitted.

In addition to steady state temperature performance requirements, transient temperature performance requirements dealing with temperature overshoots or undershoots when the operating conditions suddenly change are increasingly being included in valve specifications for certain applications, especially in the healthcare market. Transient temperature changes typically arise when the desired water temperature is changed, for example from cold to hot or where the valve is initially turned on. Under these conditions, the valve may initially change the relative proportions of hot and cold water more than is required before settling to produce water having the new desired temperature. The size and duration of any temperature overshoot or undershoot may only last a few seconds but is again discernible to the user if more than a few degrees and can be uncomfortable even if not presenting a safety risk.

A common approach to meet these tighter performance standards has been to seek to improve the thermal control system and in particular the accuracy and speed of response of the system to detected changes in the desired temperature of the water. This approach is based on the assumption that the water has been properly mixed so that the system responds equally to any changes tending to increase or decrease the desired water temperature.

This approach has not been completely successful, however, and in many cases valve performance is generally not as good as predicted by theoretical calculations. Often the valve responds more to changes in one water supply than the other and the thermal control system is adapted by trial and error to produce an arrangement in which the response is consistent to changes in either supply. In particular, the outlet water temperature may deviate from that selected if the inlet pressures change and skewing the response of the valve to inlet pressure changes may be required to ensure that any deviation of the outlet water temperature fits within a permitted tolerance range. Such skewing of the response is undesirable however as it may not result in optimum performance for all the circumstances that may arise in use.

As a result of extensive testing, we have now found that in many existing valve designs incomplete mixing of the water occurs and the water temperature detected by the thermal control system is made up of the temperature of partially mixed and unmixed streams of hot and cold water. Indeed, for some designs, as little as 25% of the water stream is made up of mixed water having the desired temperature.

Typically, the waterways within the valve are made up of spaces between valve components and are not particularly streamlined. This can produce variations in the flow through the valve which, together with incomplete mixing of the water, is now believed to be a reason for quite significant variations in performance occurring from one valve to another. For example, we have found that when a valve that fails to meet the required performance standards during testing is taken apart, there is often nothing wrong with it and, when re-assembled with the same components, the valve can pass the performance standards on re-testing.

As a result, a considerable amount of time and attention has been spent in ensuring that only valve components of the highest quality are used and that assembly is carried out very carefully. This adds considerably to production costs and the fundamental problem of variations in performance between valves assembled from the same components still persists.

The present invention has been made from a consideration of the aforementioned disadvantages and drawbacks of existing thermostatic mixing valves.

SUMMARY

It is a desired object of the present invention to provide an improved thermostatic mixing valve that is operable in a reliable manner.

It is yet another preferred object of the present invention to provide an improved thermostatic mixing valve having performance characteristics consistent with theoretical calculations.

It is a still further desired object of the present invention to provide an improved thermostatic mixing valve having application to installations for different requirements.

Other preferred objects of the present invention will be apparent from the description later herein of exemplary embodiments.

According to a first aspect of the present invention we provide a thermostatic mixing valve having a hot water inlet for connection to a supply of hot water, a cold water inlet for connection to a supply of cold water, an outlet for temperature controlled water, valve means for controlling the relative proportions of hot and cold water admitted to a mixing chamber, the outlet communicating with the mixing chamber to receive temperature controlled water having a desired temperature, temperature control means for adjusting the valve means in accordance with the desired temperature of the temperature controlled water, each inlet communicating with a multi-stage plenum chamber constructed and arranged to distribute flow of water to porting of the valve means for admitting the water to the mixing chamber.

By this invention, the incoming flows of hot and cold water are managed to produce conditions that reduce asymmetric flow patterns and promote thorough mixing of the water flows. As a result, a faster, more accurate response to change in the outlet water temperature can be achieved both for steady state operation to maintain a desired outlet water temperature substantially constant and to reduce transient temperature overshoots/undershoots when the desired outlet water temperature is adjusted by the user.

This approach to manage the incoming water flows is totally different to the prior art. More especially, the present invention recognises and provides a solution to the problems of incomplete mixing of the hot and cold flows on the accuracy and reliability of the thermal control systems employed to adjust the relative proportions of the hot and cold flows. In particular, the present invention enhances the mixing of the hot and cold flows by distributing the flows uniformly with respect to the porting for admitting the flows to the mixing chamber.

In this way, the development of asymmetric flow patterns that tend to keep the flows separate is reduced or eliminated. As a result, substantially complete mixing of the flows to provide a fully blended flow can be achieved within a mixing chamber of relatively small volume. This enables detection of the outlet water temperature to be carried out soon after the flows have been brought together and enhances the response of the valve to changes in the desired water temperature.

Each inlet preferably communicates with an annular outer chamber of a two stage plenum chamber having an annular inner chamber separated from the outer chamber by partition means arranged so that water flows around the outer chamber and into the inner chamber at a position axially spaced from the porting of the valve means.

In this way, the water is initially distributed around the outer chamber and approaches the porting in an axial direction within the inner chamber. As a result, swirling flow vectors are significantly reduced as the water approaches the porting and the distribution of water volume and velocity energy is substantially even around the porting for both flows. This produces essentially identical mixing conditions for both flows entering the mixing chamber that in turn leads to enhanced mixing that avoids the formation of separate streams of mixed and unmixed water.

Preferably, each plenum chamber is of similar size and shape so that the distribution of flows is substantially the same. As a result, both flows are matched so that any asymmetry is cancelled out when the flows merge within the mixing chamber. In this way, conditions in which separate streams of mixed and unmixed water may be formed are eliminated to a large extent.

The partition means separating the outer and inner chambers may be an annular wall provided with at least one opening for water to flow into the inner chamber. Preferably, the opening provides a substantially uniform distribution of the water flow around the inner chamber. For example, the opening may be in the form of a continuous annular slot in the wall between the outer and inner chambers. Alternatively, the opening may be in the form of a series of slots or holes of uniform size and shape formed in the wall between the outer and inner chambers with a regular spacing between the slots in the circumferential direction.

Preferably, the opening is offset relative to the point at which the water flow enters the outer chamber. In this way, the water is prevented from flowing directly into the inner chamber and is confined to flow around the outer chamber. This further contributes to a uniform distribution of water flowing towards the porting within the inner chamber.

In a preferred arrangement, the opening is axially offset relative to the point at which the water flow enters the outer chamber. In this way, the water flow is distributed around the outer chamber and approaches the opening in an axial direction before flowing into the inner chamber. This leads to a further reduction in swirling flow vectors and enhances uniform distribution of the water flow towards the porting within the inner chamber.

The valve means may comprise a shuttle valve mounted for axial movement relative to annular hot and cold seats to vary the relative proportions of hot and cold water admitted to the mixing chamber. Preferably, the hot and cold seats are close together so that the water flows are brought together and merge quickly. The shuttle valve may comprise a cylindrical shuttle of short axial length mounted between the hot and cold seats and having an annular sealing face at each end for co-operating with the hot and cold seats. More preferably, however, the hot and cold seats are positioned between a pair of hot and cold shuttles having annular sealing faces for co-operating with the hot and cold seats. For example, the hot and cold seats may be provided by opposite sides of an annular seating member such as a washer. In this way, the hot and cold flows may enter the mixing chamber at substantially the same axial position. In either arrangement, the hot seat at least may be resilient for enhanced sealing contact with the opposed sealing face of the shuttle to cut-off the flow of hot water.

Alternatively, the valve means may comprise a spool valve mounted for axial movement relative to an annular flow separator to vary the relative proportions of hot and cold water admitted to the mixing chamber. The spool valve may comprise a cylindrical shuttle axially movable relative to an O-ring to vary the area of axially extending slots in the shuttle to the flows of hot and cold water. This arrangement brings the flows of hot and cold water together quickly and promotes mixing of the flows. The slots may be inclined to the longitudinal axis of the shuttle so that the flows of hot and cold water are offset in the circumferential direction. This causes the flows to interlace and further promotes mixing of the flows.

Preferably, the flow of hot and cold water across the hot and cold seats is in a radial inwards direction and both flows are then turned in an axial direction to merge within the mixing chamber. For example, the flows may contact curved surfaces arranged to guide the flows in the axial direction. One or both of the hot and cold flows may be provided with a curved surface on the inboard edge of the porting such that turning the flows in the axial direction is assisted by the Coanda effect. Turning the flows in the axial direction creates an area of low pressure on the upstream side of that flow that may be used to entrain and assist the other flow. This may usefully be employed where the hot water flow is at a higher pressure to entrain the cold water flow and thereby improve the response of the thermal control system to change in the desired temperature of the water.

The mixing chamber is preferably sized to match the total flow through the valve. The total flow is dependent on the combined waterway cross-sectional areas at the hot and cold seats and is substantially constant for all adjusted positions of the valve means. By sizing the mixing chamber to match the permitted flow in this way, the velocity energy of the hot and cold flows admitted to the mixing chamber is largely maintained. This contributes to the creation of turbulent flow within the mixing chamber that promotes thorough mixing of the hot and cold water flows. As a result, substantially complete mixing can be achieved over a relatively short distance from the point the hot and cold flows are brought together within the mixing chamber. In this way, fast, accurate response of the thermostat to changes in the desired water temperature is achieved by ensuring the thermostat is exposed to water that has been properly mixed and by reducing transport delays.

We have found that the above benefits and advantages are optimised if the cross-sectional area of the mixing chamber is from 1 to 1.5 times and more preferably from 1 to 1.25 times the combined cross-sectional areas of the hot and cold flows and the axial length of the mixing chamber is at least 5 times the width of the mixing chamber and more preferably from 5 to 10 times the width of the mixing chamber.

The mixing chamber may be of any suitable shape and is preferably of annular ring shape between inner and outer walls. In this way, the width of the mixing chamber can be kept small thereby reducing the axial length required to achieve complete mixing of the hot and cold flows. As a result, the mixing chamber can be accommodated without having to increase the overall size of the valve compared to existing valves.

Advantageously, the mixing chamber has smooth walls and is shaped to provide substantially unobstructed flow with a gradual increase in cross-sectional area in the direction of flow. In this way, mixing of the hot and cold flows is further enhanced and some of the velocity energy required for turbulent flow may be recovered as pressure energy for discharge of the mixed water from the valve.

Preferably, the temperature control means is linked to the valve means for user selection of a desired water temperature and is operable to maintain the selected temperature substantially constant. In this way, user selection of a range of water temperatures, for example from cold to 60° C. may be permitted by any suitable means, for example a rotatable control knob or push button or other means of temperature selection.

The temperature control means may be of any suitable type commonly employed in thermostatic mixing valves to respond to a detected deviation of the mixed water temperature from the desired temperature to adjust the valve means to return the mixed water temperature to the desired temperature. For example, the temperature control means may comprise a thermostat containing a filler such as wax arranged to sense the temperature of the mixed water and an actuator responsive to expansion/contraction of the filler to adjust the valve means. Alternatively, the temperature control means may comprise at least one temperature sensor such as a thermistor arranged to sense the temperature of the mixed water and an actuator such as an electric motor operable under the control of a controller such as a microprocessor to adjust the valve means.

The valve may include means for controlling the flow of hot and/or cold water. The flow control may be separate from the temperature control or may be linked to the temperature control.

In one arrangement, the flow control is separate from the temperature control and comprises flow control valves between the inlets and each plenum chamber for controlling the flows of hot and cold water. Preferably the flow control valves are linked for operation simultaneously by a common control member such as a rotatable flow control knob or any other suitable means. For example, each flow control valve may comprise a sliding plate valve with at least one fixed valve plate and one movable valve plate for controlling flow. Preferably, the movable plate is adjustable between a closed position in which openings in the plates are out of alignment to shut-off the flow and a range of open positions in which the openings overlap by varying amounts to adjust the flow. The plates may be ceramic plates.

In another arrangement, the flow control is linked to the temperature control and is operable to control the flows in sequence whereby the cold water flow is turned on first during start-up and the hot water flow is turned off first during close-down. In this way, the water temperature increases from full cold when the valve is initially turned on and reduces to full cold again when the valve is finally turned off.

Preferably, the valve comprises a main body having the inlets for connection to the hot and cold supplies and the outlet for connection to an ablutionary appliance and an opening for reception of a cartridge unit housing the valve means. The outer chamber of each plenum chamber may be defined between the valve body and the cartridge unit with the inner chamber being formed inside in the cartridge unit and communicating with the outer chamber via at least one opening in the wall of the cartridge unit.

Preferably the cartridge unit carries seals, for example O-rings for sealing the cartridge unit in the valve body and separating the outer chambers. The O-rings may be of decreasing diameter from the outer end to the inner end of the cartridge unit to provide clearance for insertion of the cartridge unit. In this way, fitment and removal of the cartridge unit is facilitated and sealing engagement is obtained when the cartridge unit is fully inserted in the valve body.

According to a second aspect of the invention we provide a thermostatic mixing valve for hot and cold water having two-stage inlet chambers for the hot and cold water flows respectively, the inlet chambers being arranged to distribute the flows uniformly with respect to porting for admitting the flows to a mixing chamber to reduce asymmetric flow patterns and promote thorough mixing of the flows within the mixing chamber.

According to a third aspect of the present invention we provide a method of reducing asymmetric flow patterns and promoting thorough mixing of flows of hot and cold water within a mixing chamber of a thermostatic mixing valve comprising providing multi-stage inlet chambers for the hot and cold water flows respectively, and arranging the inlet chambers to distribute the flows uniformly with respect to porting for admitting the flows to a mixing chamber.

According to a fourth aspect of the present invention we provide a thermostatic mixing valve having a hot water inlet for connection to a supply of hot water, a cold water inlet for connection to a supply of cold water, an outlet for temperature controlled water, valve means for controlling the relative proportions of hot and cold water admitted to a mixing chamber, the outlet communicating with the mixing chamber to receive temperature controlled water having a desired temperature, temperature control means for adjusting the valve means in accordance with the desired temperature of the temperature controlled water, wherein the mixing chamber is sized to match the total flow through the valve.

By sizing the mixing chamber to match the total flow through the valve, the velocity energy of the hot and cold flows admitted to the mixing chamber is largely maintained. This contributes to the creation of turbulent flow within the mixing chamber that promotes thorough mixing of the hot and cold water flows. As a result, substantially complete mixing can be achieved over a relatively short distance from the point the hot and cold flows are brought together within the mixing chamber. In this way, fast, accurate response to changes in the desired water temperature is achieved by ensuring the control means responds to water that has been properly mixed and by reducing transport delays. As a result, steady state operation to maintain a desired outlet water temperature substantially constant is more reliable and transient temperature overshoots/undershoots when the desired outlet water temperature is adjusted by the user may be reduced.

This approach is totally different to the prior art. More especially, the present invention recognises and provides a solution to the problems of incomplete mixing of the hot and cold flows on the accuracy and reliability of the thermal control systems employed to adjust the relative proportions of the hot and cold flows. In particular, the present invention enhances the mixing of the hot and cold flows by sizing the mixing chamber to create turbulent flow conditions. In this way, the development of asymmetric flow patterns that tend to keep the flows separate is reduced or eliminated. As a result, substantially complete mixing of the flows to provide a fully blended flow can be achieved within a mixing chamber of relatively small volume. This enables detection of the outlet water temperature to be carried out soon after the flows have been brought together and enhances the response of the valve to changes in the desired water temperature.

The total flow through the valve is dependent on the combined waterway cross-sectional areas of the hot and cold flows through the proportional valve means and is substantially constant for all adjusted positions of the valve means.

We have found that the above benefits and advantages are optimised if the cross-sectional area of the mixing chamber is from 1 to 1.5 times and more preferably from 1 to 1.25 times the combined cross-sectional areas of the hot and cold flows. In this way, turbulent flow conditions are optimised and substantially complete mixing of the hot and cold flows can be achieved if the axial length of the mixing chamber is at least 5 times the width of the mixing chamber and more preferably from 5 to 10 times the width of the mixing chamber.

The mixing chamber may be of any suitable shape and is preferably of annular ring shape between inner and outer walls. In this way, the width of the mixing chamber can be kept small thereby reducing the axial length required to achieve complete mixing of the hot and cold flows. As a result, the mixing chamber can be accommodated without having to increase the overall size of the valve compared to existing valves.

Advantageously, the mixing chamber has smooth walls and is shaped to provide substantially unobstructed flow with a gradual increase in cross-sectional area in the direction of flow. In this way, mixing of the hot and cold flows is further enhanced and some of the velocity energy required for turbulent flow may be recovered as pressure energy for discharge of the mixed water from the valve.

Each inlet preferably communicates with an annular outer chamber of a two stage plenum chamber having an annular inner chamber separated from the outer chamber by partition means arranged so that water flows around the outer chamber and into the inner chamber at a position axially spaced from the porting of the valve means.

In this way, the water is initially distributed around the outer chamber and approaches the porting in an axial direction within the inner chamber. As a result, swirling flow vectors are significantly reduced as the water approaches the porting and the distribution of water volume and velocity energy is substantially even around the porting for both flows. This produces essentially identical mixing conditions for both flows entering the mixing chamber that in turn leads to enhanced mixing that avoids the formation of separate streams of mixed and unmixed water.

Preferably, each plenum chamber is of similar size and shape so that the distribution of flows is substantially the same. As a result, both flows are matched so that any asymmetry is cancelled out when the flows merge within the mixing chamber. In this way, conditions in which separate streams of mixed and unmixed water may be formed are eliminated to a large extent.

The partition means separating the outer and inner chambers may be an annular wall provided with at least one opening for water to flow into the inner chamber. Preferably, the opening provides a substantially uniform distribution of the water flow around the inner chamber. For example, the opening may be in the form of a continuous annular slot in the wall between the outer and inner chambers. Alternatively, the opening may be in the form of a series of slots or holes of uniform size and shape formed in the wall between the outer and inner chambers with a regular spacing between the slots in the circumferential direction.

Preferably, the opening is offset relative to the point at which the water flow enters the outer chamber. In this way, the water is prevented from flowing directly into the inner chamber and is confined to flow around the outer chamber. This further contributes to a uniform distribution of water flowing towards the porting within the inner chamber.

In a preferred arrangement, the opening is axially offset relative to the point at which the water flow enters the outer chamber. In this way, the water flow is distributed around the outer chamber and approaches the opening in an axial direction before flowing into the inner chamber. This leads to a further reduction in swirling flow vectors and enhances uniform distribution of the water flow towards the porting within the inner chamber.

By this use of two-stage plenum chambers, the incoming flows of hot and cold water are managed to produce conditions that help to reduce asymmetric flow patterns and further promote thorough mixing of the water flows within the mixing chamber. More especially, the plenum chambers distribute the flows uniformly with respect to the porting for admitting the flows to the mixing chamber. In this way, the development of asymmetric flow patterns that tend to keep the flows separate is reduced or eliminated.

The valve means may comprise a shuttle valve mounted for axial movement relative to annular hot and cold seats to vary the relative proportions of hot and cold water admitted to the mixing chamber. Preferably, the hot and cold seats are close together so that the water flows are brought together and merge quickly. The shuttle valve may comprise a cylindrical shuttle of short axial length mounted between the hot and cold seats and having an annular sealing face at each end for co-operating with the hot and cold seats. More preferably, however, the hot and cold seats are positioned between a pair of hot and cold shuttles having annular sealing faces for co-operating with the hot and cold seats. For example, the hot and cold seats may be provided by opposite sides of an annular seating member such as a washer. In this way, the hot and cold flows may enter the mixing chamber at substantially the same axial position. In either arrangement, the hot seat at least may be resilient for enhanced sealing contact with the opposed sealing face of the shuttle to cut-off the flow of hot water.

Alternatively, the valve means may comprise a spool valve mounted for axial movement relative to an annular flow separator to vary the relative proportions of hot and cold water admitted to the mixing chamber. The spool valve may comprise a cylindrical shuttle axially movable relative to an O-ring to vary the area of axially extending slots in the shuttle to the flows of hot and cold water. This arrangement brings the flows of hot and cold water together quickly and promotes mixing of the flows. The slots may be inclined to the longitudinal axis of the shuttle so that the flows of hot and cold water are offset in the circumferential direction. This causes the flows to interlace and further promotes mixing of the flows.

Preferably, the flow of hot and cold water across the hot and cold seats is in a radial inwards direction and both flows are then turned in an axial direction to merge within the mixing chamber. For example, the flows may contact curved surfaces arranged to guide the flows in the axial direction. One or both of the hot and cold flows may be provided with a curved surface on the inboard edge of the porting such that turning the flows in the axial direction is assisted by the Coanda effect. Turning the flows in the axial direction creates an area of low pressure on the upstream side of that flow that may be used to entrain and assist the other flow. This may usefully be employed where the hot water flow is at a higher pressure to entrain the cold water flow and thereby improve the response of the thermal control system to change in the desired temperature of the water.

Preferably, the temperature control means is linked to the valve means for user selection of a desired water temperature and is operable to maintain the selected temperature substantially constant. In this way, user selection of a range of water temperatures, for example from cold to 60° C. may be permitted by any suitable means, for example a rotatable control knob or push button or other means of temperature selection.

The temperature control means may be of any suitable type commonly employed in thermostatic mixing valves to respond to a detected deviation of the mixed water temperature from the desired temperature to adjust the valve means to return the mixed water temperature to the desired temperature. For example, the temperature control means may comprise a thermostat containing a filler such as wax arranged to sense the temperature of the mixed water and an actuator responsive to expansion/contraction of the filler to adjust the valve means. Alternatively, the temperature control means may comprise at least one temperature sensor such as a thermistor arranged to sense the temperature of the mixed water and an actuator such as an electric motor operable under the control of a controller such as a microprocessor to adjust the valve means.

The valve may include means for controlling the flow of hot and/or cold water. The flow control may be separate from the temperature control or may be linked to the temperature control.

In one arrangement, the flow control is separate from the temperature control and comprises flow control valves between the inlets and each plenum chamber for controlling the flows of hot and cold water. Preferably the flow control valves are linked for operation simultaneously by a common control member such as a rotatable flow control knob or any other suitable means. For example, each flow control valve may comprise a sliding plate valve with at least one fixed valve plate and one movable valve plate for controlling flow. Preferably, the movable plate is adjustable between a closed position in which openings in the plates are out of alignment to shut-off the flow and a range of open positions in which the openings overlap by varying amounts to adjust the flow. The plates may be ceramic plates.

In another arrangement, the flow control is linked to the temperature control and is operable to control the flows in sequence whereby the cold water flow is turned on first during start-up and the hot water flow is turned off first during close-down. In this way, the water temperature increases from full cold when the valve is initially turned on and reduces to full cold again when the valve is finally turned off.

Preferably, the valve comprises a main body having the inlets for connection to the hot and cold supplies and the outlet for connection to an ablutionary appliance and an opening for reception of a cartridge unit housing the valve means. The outer chamber of each plenum chamber may be defined between the valve body and the cartridge unit with the inner chamber being formed inside in the cartridge unit and communicating with the outer chamber via at least one opening in the wall of the cartridge unit.

Preferably the cartridge unit carries seals, for example O-rings for sealing the cartridge unit in the valve body and separating the outer chambers. The O-rings may be of decreasing diameter from the outer end to the inner end of the cartridge unit to provide clearance for insertion of the cartridge unit. In this way, fitment and removal of the cartridge unit is facilitated and sealing engagement is obtained when the cartridge unit is fully inserted in the valve body.

According to a fifth aspect of the present invention we provide a thermostatic mixing valve having a hot water inlet for connection to a supply of hot water, a cold water inlet for connection to a supply of cold water, an outlet for temperature controlled water, valve means for controlling the relative proportions of hot and cold water admitted to a mixing chamber, the outlet communicating with the mixing chamber to receive temperature controlled water having a desired temperature, temperature control means for adjusting the valve means in accordance with the desired temperature of the temperature controlled water, wherein the mixing chamber has a cross-sectional area 1 to 1.5 times the combined cross-sectional areas of the hot and cold flows through the proportioning valve means.

According to a sixth aspect of the present invention we provide a thermostatic mixing valve having a hot water inlet for connection to a supply of hot water, a cold water inlet for connection to a supply of cold water, an outlet for temperature controlled water, valve means for controlling the relative proportions of hot and cold water admitted to a mixing chamber, the outlet communicating with the mixing chamber to receive temperature controlled water having a desired temperature, temperature control means for adjusting the valve means in accordance with the desired temperature of the temperature controlled water, wherein the mixing chamber has an axial length at least 5 times the width of the mixing chamber.

According to a seventh aspect of the present invention we provide a thermostatic mixing valve having a hot water inlet for connection to a supply of hot water, a cold water inlet for connection to a supply of cold water, an outlet for temperature controlled water, valve means for controlling the relative proportions of hot and cold water admitted to a mixing chamber, the outlet communicating with the mixing chamber to receive temperature controlled water having a desired temperature, temperature control means for adjusting the valve means in accordance with the desired temperature of the temperature controlled water, wherein the mixing chamber has a cross-sectional area relative to the combined cross-sectional areas of the hot and cold flows such that the velocity energy of the hot and cold flows is sufficient to create turbulent flow conditions within the mixing chamber.

Preferably, the cross-sectional area of the mixing chamber is at least equal to the combined cross-sectional areas of the hot and cold flows.

According to an eighth aspect of the present invention we provide a thermostatic mixing valve having a hot water inlet for connection to a supply of hot water, a cold water inlet for connection to a supply of cold water, an outlet for temperature controlled water, valve means for controlling the relative proportions of hot and cold water admitted to a mixing chamber, the outlet communicating with the mixing chamber to receive temperature controlled water having a desired temperature, temperature control means for adjusting the valve means in accordance with the desired temperature of the temperature controlled water, wherein the mixing chamber is arranged so that incoming streams of hot and cold water are turned to flow in the same direction such that flow of the hot stream entrains and assists flow of the cold stream.

By this invention, the incoming streams of hot and cold water are managed so that the interaction between the hot and cold streams tend to aid the temperature control process. In particular, flow of the entrained cold stream is increased by an increase in pressure of the hot stream tending to maintain the initial proportions of hot and cold water and assist the response of the temperature control means to maintain the desired temperature.

Preferably, the hot and cold streams enter the mixing chamber in a radial direction and are turned in an axial direction to merge within the mixing chamber. For example, one or both of the streams may contact curved surfaces arranged to guide the streams in the axial direction. The curved surfaces may be provided by radially inner and outer walls of the mixing chamber. The inner wall may assist turning one of the streams and the outer wall assist turning the other stream. In this way, undesirable crossing of the streams affecting the flow through the valve may be reduced. Turning the water stream by the inner wall may be assisted by the Coanda effect.

Advantageously, the hot and cold streams enter the mixing chamber close together in the axial direction of flow whereby each stream entrains and assists the flow of the other stream. In this way an increase in pressure of either stream tends to increase the flow of the other stream to assist the response of the temperature control means to maintain the desired temperature.

The valve means may comprise a shuttle valve mounted for axial movement relative to annular hot and cold seats to vary the relative proportions of hot and cold water admitted to the mixing chamber.

Preferably, the hot seat at least is resilient for enhanced sealing contact with an opposed sealing face of the shuttle valve to cut-off the flow of hot water.

The shuttle valve may comprise a cylindrical shuttle of short axial length mounted between the hot and cold seats and having annular sealing faces at opposite ends for co-operating with the hot and cold seats.

More preferably, however, the hot and cold seats are positioned between a pair of hot and cold shuttles having annular sealing faces for co-operating with the hot and cold seats. In this way, the hot and cold streams enter the mixing chamber at substantially the same axial position so that the streams are brought together and merge quickly to promote mixing of the streams.

In one arrangement, the hot and cold seats are provided by opposite sides of an annular seating member such as a washer. The seating member may be incorporated in the valve body.

Alternatively, the valve means may comprise a spool valve mounted for axial movement relative to an annular flow separator to vary the relative proportions of hot and cold water admitted to the mixing chamber.

The spool valve may comprise a cylindrical shuttle axially movable relative to an O-ring to vary the area of axially extending slots in the shuttle to the streams of hot and cold water. This arrangement brings the streams of hot and cold water together quickly and promotes mixing of the streams.

The slots may be inclined to the longitudinal axis of the shuttle so that the streams of hot and cold water are offset in the circumferential direction. This causes the streams to interlace and further promotes mixing of the streams.

Preferably, each inlet communicates with an annular outer chamber of a two stage plenum chamber having an annular inner chamber separated from the outer chamber by partition means arranged so that water flows around the outer chamber and into the inner chamber at a position axially spaced from the porting of the valve means.

In this way, the water is initially distributed around the outer chamber and approaches the porting in an axial direction within the inner chamber. As a result, swirling flow vectors are significantly reduced as the water approaches the porting and the distribution of water volume and velocity energy is substantially even around the porting for both flows. This produces essentially identical mixing conditions for both flows entering the mixing chamber that in turn leads to enhanced mixing that avoids the formation of separate streams of mixed and unmixed water.

Preferably, each plenum chamber is of similar size and shape so that the distribution of flows is substantially the same. As a result, both flows are matched so that any asymmetry is cancelled out when the flows merge within the mixing chamber. In this way, conditions in which separate streams of mixed and unmixed water may be formed are eliminated to a large extent.

The partition means separating the outer and inner chambers may be an annular wall provided with at least one opening for water to flow into the inner chamber. Preferably, the opening provides a substantially uniform distribution of the water flow around the inner chamber. For example, the opening may be in the form of a continuous annular slot in the wall between the outer and inner chambers. Alternatively, the opening may be in the form of a series of slots or holes of uniform size and shape formed in the wall between the outer and inner chambers with a regular spacing between the slots in the circumferential direction.

Preferably, the opening is offset relative to the point at which the water flow enters the outer chamber. In this way, the water is prevented from flowing directly into the inner chamber and is confined to flow around the outer chamber. This further contributes to a uniform distribution of water flowing towards the porting within the inner chamber.

In a preferred arrangement, the opening is axially offset relative to the point at which the water flow enters the outer chamber. In this way, the water flow is distributed around the outer chamber and approaches the opening in an axial direction before flowing into the inner chamber. This leads to a further reduction in swirling flow vectors and enhances uniform distribution of the water flow towards the porting within the inner chamber.

In this way, the development of asymmetric flow patterns that tend to keep the flows separate is reduced or eliminated.

As a result, substantially complete mixing of the flows to provide a fully blended flow can be achieved within a mixing chamber of relatively small volume. This enables detection of the outlet water temperature to be carried out soon after the flows have been brought together and enhances the response of the valve to changes in the desired water temperature.

The mixing chamber is preferably sized to match the total flow through the valve. The total flow is dependent on the combined waterway cross-sectional areas at the hot and cold seats and is substantially constant for all adjusted positions of the valve means. By sizing the mixing chamber to match the permitted flow in this way, the velocity energy of the hot and cold flows admitted to the mixing chamber is largely maintained. This contributes to the creation of turbulent flow within the mixing chamber that promotes thorough mixing of the hot and cold water flows.

As a result, substantially complete mixing can be achieved over a relatively short distance from the point the hot and cold flows are brought together within the mixing chamber. In this way, fast, accurate response of the thermostat to changes in the desired water temperature is achieved by ensuring the thermostat is exposed to water that has been properly mixed and by reducing transport delays.

We have found that the above benefits and advantages are optimised if the cross-sectional area of the mixing chamber is from 1 to 1.5 times and more preferably from 1 to 1.25 times the combined cross-sectional areas of the hot and cold flows and the axial length of the mixing chamber is at least 5 times the width of the mixing chamber and more preferably from 5 to 10 times the width of the mixing chamber.

The mixing chamber may be of any suitable shape and is preferably of annular ring shape between inner and outer walls. In this way, the width of the mixing chamber can be kept small thereby reducing the axial length required to achieve complete mixing of the hot and cold flows. As a result, the mixing chamber can be accommodated without having to increase the overall size of the valve compared to existing valves.

Advantageously, the mixing chamber has smooth walls and is shaped to provide substantially unobstructed flow with a gradual increase in cross-sectional area in the direction of flow. In this way, mixing of the hot and cold flows is further enhanced and some of the velocity energy required for turbulent flow may be recovered as pressure energy for discharge of the mixed water from the valve.

Preferably, the temperature control means is linked to the valve means for user selection of a desired water temperature and is operable to maintain the selected temperature substantially constant. In this way, user selection of a range of water temperatures, for example from cold to 60° C. may be permitted by any suitable means, for example a rotatable control knob or push button or other means of temperature selection.

The temperature control means may be of any suitable type commonly employed in thermostatic mixing valves to respond to a detected deviation of the mixed water temperature from the desired temperature to adjust the valve means to return the mixed water temperature to the desired temperature. For example, the temperature control means may comprise a thermostat containing a filler such as wax arranged to sense the temperature of the mixed water and an actuator responsive to expansion/contraction of the filler to adjust the valve means. Alternatively, the temperature control means may comprise at least one temperature sensor such as a thermistor arranged to sense the temperature of the mixed water and an actuator such as an electric motor operable under the control of a controller such as a microprocessor to adjust the valve means.

The valve may include means for controlling the flow of hot and/or cold water. The flow control may be separate from the temperature control or may be linked to the temperature control.

In one arrangement, the flow control is separate from the temperature control and comprises flow control valves between the inlets and each plenum chamber for controlling the flows of hot and cold water. Preferably the flow control valves are linked for operation simultaneously by a common control member such as a rotatable flow control knob or any other suitable means. For example, each flow control valve may comprise a sliding plate valve with at least one fixed valve plate and one movable valve plate for controlling flow. Preferably, the movable plate is adjustable between a closed position in which openings in the plates are out of alignment to shut-off the flow and a range of open positions in which the openings overlap by varying amounts to adjust the flow. The plates may be ceramic plates.

In another arrangement, the flow control is linked to the temperature control and is operable to control the flows in sequence whereby the cold water flow is turned on first during start-up and the hot water flow is turned off first during close-down. In this way, the water temperature increases from full cold when the valve is initially turned on and reduces to full cold again when the valve is finally turned off.

Preferably, the valve comprises a main body having the inlets for connection to the hot and cold supplies and the outlet for connection to an ablutionary appliance and an opening for reception of a cartridge unit housing the valve means. The outer chamber of each plenum chamber may be defined between the valve body and the cartridge unit with the inner chamber being formed inside in the cartridge unit and communicating with the outer chamber via at least one opening in the wall of the cartridge unit.

Preferably the cartridge unit carries seals, for example O-rings for sealing the cartridge unit in the valve body and separating the outer chambers. The O-rings may be of decreasing diameter from the outer end to the inner end of the cartridge unit to provide clearance for insertion of the cartridge unit. In this way, fitment and removal of the cartridge unit is facilitated and sealing engagement is obtained when the cartridge unit is fully inserted in the valve body.

According to a ninth aspect of the present invention we provide a thermostatic mixing valve having a hot water inlet for connection to a supply of hot water, a cold water inlet for connection to a supply of cold water, an outlet for temperature controlled water, valve means for controlling the relative proportions of hot and cold water admitted to a mixing chamber, the outlet communicating with the mixing chamber to receive temperature controlled water having a desired temperature, temperature control means for adjusting the valve means in accordance with the desired temperature of the temperature controlled water, wherein the proportioning valve means comprises a shuttle valve having opposed sealing faces arranged for simultaneous movement relative to respective hot and cold valve seats positioned between the sealing faces for controlling the relative proportions of hot and cold water admitted to the mixing chamber.

By positioning the hot and cold valve seats between opposed sealing faces of the shuttle valve, the flows of hot and cold water are admitted to the mixing chamber close together in the axial direction and mixing of the flows is promoted. For example, the hot and cold valve seats may be provided on opposite sides of a thin, plate member such as a washer extending between the sealing faces.

Preferably, the sealing faces are provided by hot and cold shuttles shaped to assist turning the flows of hot and cold water in the same axial direction. For example, the shuttles may be provided with opposed curved surfaces on radially inner and outer walls of the mixing chamber. The curved surface on the inner wall may assist turning the flow due to the Coanda effect.

According to a tenth aspect of the present invention we provide a thermostatic mixing valve having a hot water inlet for connection to a supply of hot water, a cold water inlet for connection to a supply of cold water, an outlet for temperature controlled water, valve means for controlling the relative proportions of hot and cold water admitted to a mixing chamber, the outlet communicating with the mixing chamber to receive temperature controlled water having a desired temperature, temperature control means for adjusting the valve means in accordance with the desired temperature of the temperature controlled water, wherein the proportioning valve means comprises a shuttle valve having a proportioning shuttle axially slidable in a valve body relative to hot and cold seats for controlling the proportions of hot and cold water admitted to the mixing chamber, wherein the hot and cold seats are provided by opposite sides of an annular seating member integral with the valve body.

The seating member may comprise a thin, flat plate element such as a washer such that the flows of hot and cold water are admitted to the mixing chamber close together in the axial direction.

The valve body and seating member may be united in a single component by arranging the seating member as an insert in a plastics moulding die for the valve body.

According to an eleventh aspect of the present invention we provide a thermostatic mixing valve having a hot water inlet for connection to a supply of hot water, a cold water inlet for connection to a supply of cold water, an outlet for temperature controlled water, valve means for controlling the relative proportions of hot and cold water admitted to a mixing chamber, the outlet communicating with the mixing chamber to receive temperature controlled water having a desired temperature, temperature control means for adjusting the valve means in accordance with the desired temperature of the temperature controlled water, wherein the proportioning valve means comprises a shuttle valve having a valve body and a shuttle axially slidable in the valve body relative to hot and cold valve seats for controlling the relative proportions of hot and cold water admitted to the mixing chamber, the hot and cold seats being provided between opposed sealing faces of the shuttle, and guide means for maintaining the sealing faces square with respect to the valve seats.

According to a twelfth aspect of the present invention we provide a thermostatic mixing valve having a hot water inlet for connection to a supply of hot water, a cold water inlet for connection to a supply of cold water, an outlet for temperature controlled water, valve means for controlling the relative proportions of hot and cold water admitted to a mixing chamber, the outlet communicating with the mixing chamber to receive temperature controlled water having a desired temperature, temperature control means for adjusting the valve means in accordance with the desired temperature of the temperature controlled water, wherein each of the flows of hot and cold water is admitted to the mixing chamber at a plurality of openings.

Preferably, the hot flow openings alternate with the cold flow openings such that the flows interlace as they enter the mixing chamber thereby promoting mixing of the hot and cold water flows admitted to the mixing chamber.

Advantageously, the mixing chamber is of annular ring shape and the openings are arranged so that the flows of hot and cold water are offset in the circumferential direction causing the flows to interlace and promote mixing of the flows within the mixing chamber.

In one arrangement, the openings are formed in a cylindrical shuttle of a spool valve, the shuttle being mounted for axial movement relative to an annular flow separator to vary the relative proportions of hot and cold water admitted to the mixing chamber. For example, the shuttle may be axially movable relative to an O-ring separator to vary the area of axially extending slots in the shuttle to the flows of hot and cold water, the slots being inclined to the longitudinal axis of the shuttle so that the flows of hot and cold water are offset in the circumferential direction causing the flows to interlace and promote mixing of the flows within the mixing chamber.

In another arrangement, the valve means controls the relative proportions of hot and cold water admitted to separate hot and cold water chambers and the openings are provided between the hot and cold water chambers and the mixing chamber. For example, the hot and cold water chambers may be arranged concentrically at one of the mixing chamber. The valve means may be a proportioning mechanism to adjust the hot and cold flows inversely to one another. Alternatively, the valve means may comprise two separate valves that are separately controlled.

According to a thirteenth aspect of the present invention we provide a thermostatic mixing valve having a hot water inlet for connection to a supply of hot water, a cold water inlet for connection to a supply of cold water, an outlet for temperature controlled water, valve means for controlling the relative proportions of hot and cold water admitted to a mixing chamber, the outlet communicating with the mixing chamber to receive temperature controlled water having a desired temperature, temperature control means for adjusting the valve means in accordance with the desired temperature of the temperature controlled water, wherein the hot and cold water streams admitted to the mixing chamber are co-entrained.

Co-entraining the flows is beneficial in reducing potentially instability effects caused by differences between the hot and cold water pressures. Thus, if the water pressures are very different the streams of hot and cold water will have very different levels of energy. If the streams of hot and cold water entered the mixing chamber on opposite sides of the mixing chamber, there would be a risk that the higher energy stream could suppress the flow of the lower energy stream, resulting in a sudden deviation from the intended proportions of hot and cold water. An instability of the whole valve could result. Co-entraining the flows reduces suppression of the flow of the lower energy stream by the higher energy stream.

Various other features, benefits and advantages of the invented thermostatic mixing valve will be apparent from the description hereinafter of exemplary embodiments.

This invention will now be described in more detail, by way of example only, with reference to the accompanying drawings.

DETAILED DESCRIPTION OF THE EXEMPLARY EMBODIMENTS

Figure 1:
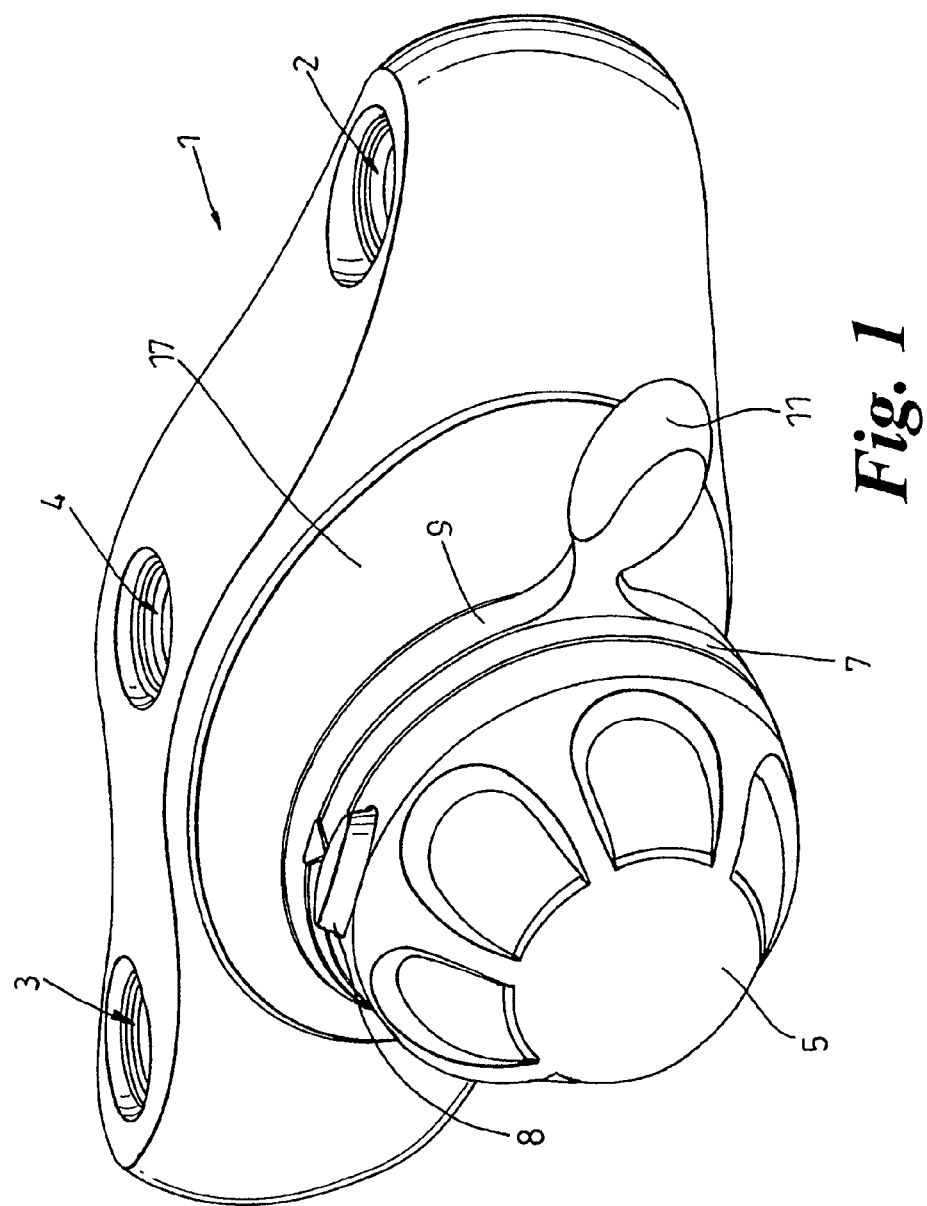
FIG. 1 is a front perspective view of a thermostatic mixing valve according to a first embodiment of the invention.

Referring first to FIGS. 1 to 4 of the accompanying drawings, a thermostatic mixing valve 1 according to a first embodiment of the invention is shown. The mixing valve 1 has inlets 2 and 3 for connection to respective supplies of cold and hot water (not shown) and an outlet 4 for discharging temperature controlled water to an ablutionary appliance (not shown) such as a spray fitting for a shower or other washing equipment.

In this embodiment, each inlet 2,3 has two ports 2a, 2b and 3a, 3b at right angles to each other for connecting the valve 1 to supply pipes from above or behind the valve 1. A blanking plug (not shown) is provided for closing each port that is not connected to a supply pipe.

The valve 1 has a rotatable temperature control knob 5 detachably mounted on a drive spindle 6 of a temperature control mechanism described in more detail later herein. The knob 5 is rotatable relative to a fixed indicator ring 7 for user selection of a range of outlet-water temperatures, for example from cold to 60° C.

A stop (not shown) is provided to limit rotation of the knob 5 for user selection of outlet water temperatures up to a pre-set temperature, for example 40° C., for safe washing/showering. The knob 5 includes an override button 8 operable by the user to release the stop and allow selection of outlet water temperatures higher then the pre-set temperature up to the maximum.

In this way, accidental or inadvertent selection of an outlet water temperature above the pre-set temperature is prevented but the user can purposely select higher temperatures if desired. The stop is automatically re-set when knob 5 is rotated to select a temperature below the pre-set temperature.

The valve 1 also has an annular flow control ring 9 mounted on a drive spindle 10 of a flow control mechanism described in more detail later herein. The control ring 9 is concentric with the control knob 5 and has a lever 11 for manual rotation of the control ring 9 for user control of a range of flows, for example from off to fully open.

Figure 2:
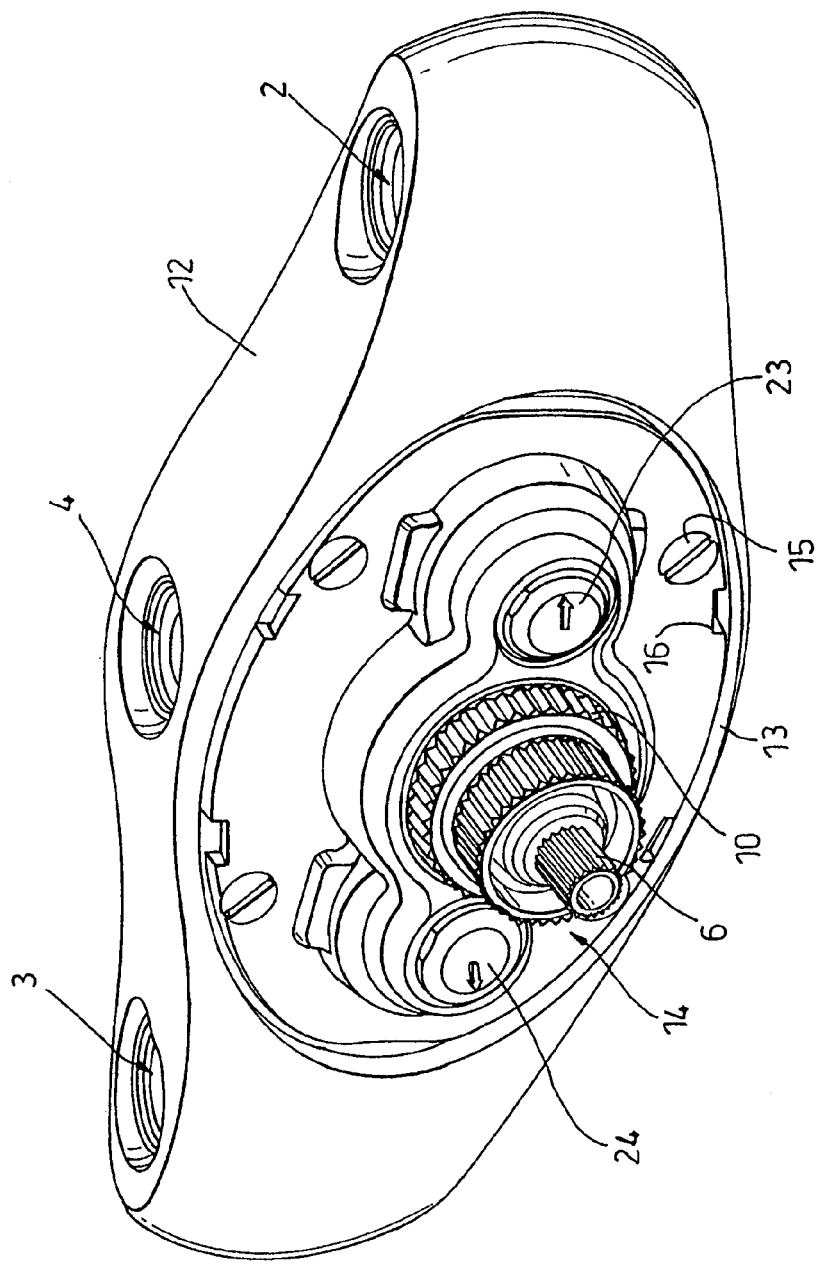
FIG. 2 is a front view, similar to FIG. 1, with the control knobs and cartridge cover removed.

As best shown in FIG. 2, the valve 1 has a body 12 with an oval opening 13 in the front for reception of a cartridge unit 14 incorporating the temperature control mechanism and flow control mechanism. The cartridge unit 14 is releasably secured in the body 12 by four screws 15 and is provided with cut-outs 16 in the marginal edge for releasably attaching a front cover 17 (FIG. 1) for the cartridge unit. The valve body 1 is symmetrical and the cartridge unit 14 can be fitted to allow connection of the hot and cold supplies either way round to suit the installation lay-out.

Figure 3:
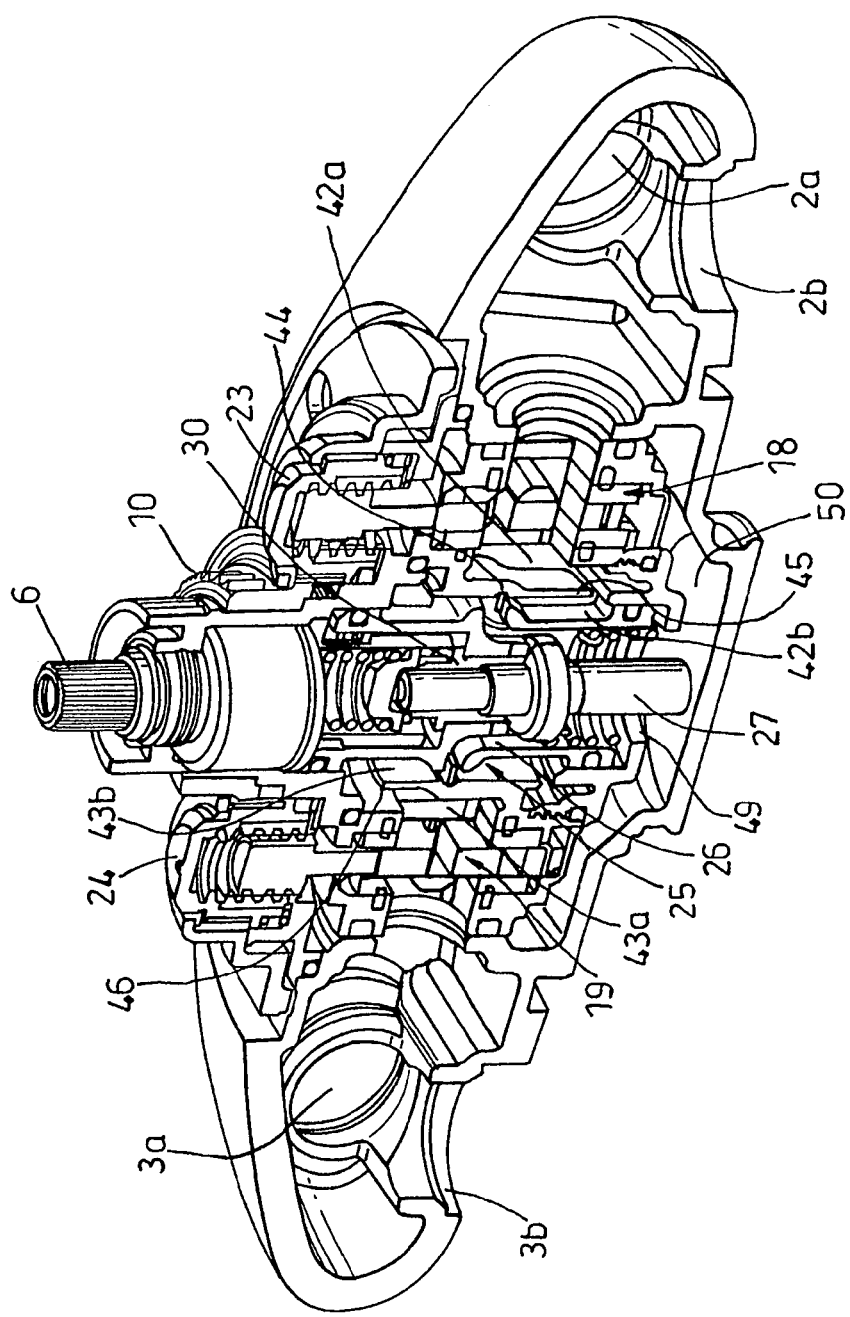
FIG. 3 is an isometric sectioned view through the valve of FIG. 1.
Figure 4:
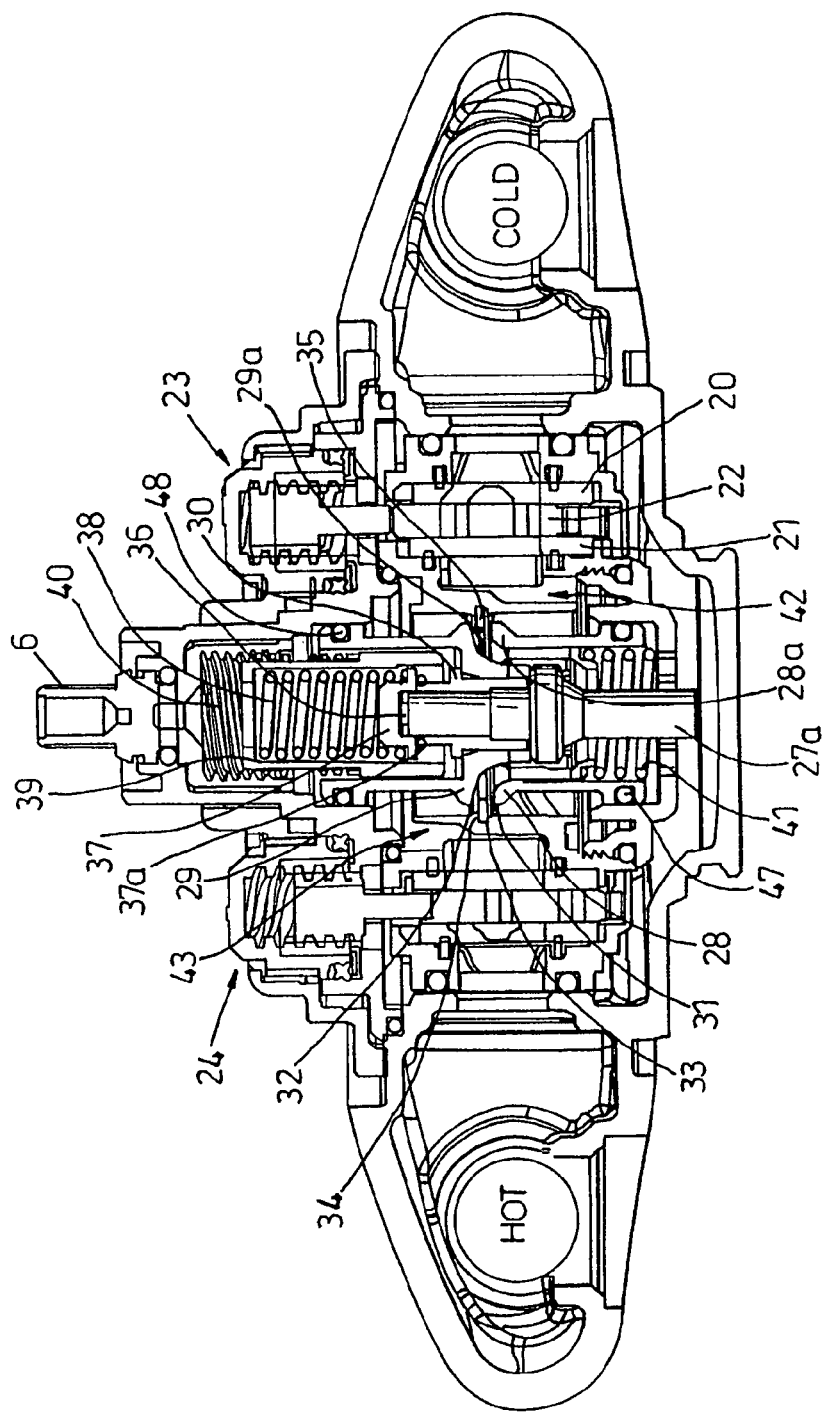
FIG. 4 is a transverse section through the valve of FIG. 1.
Figure 5:
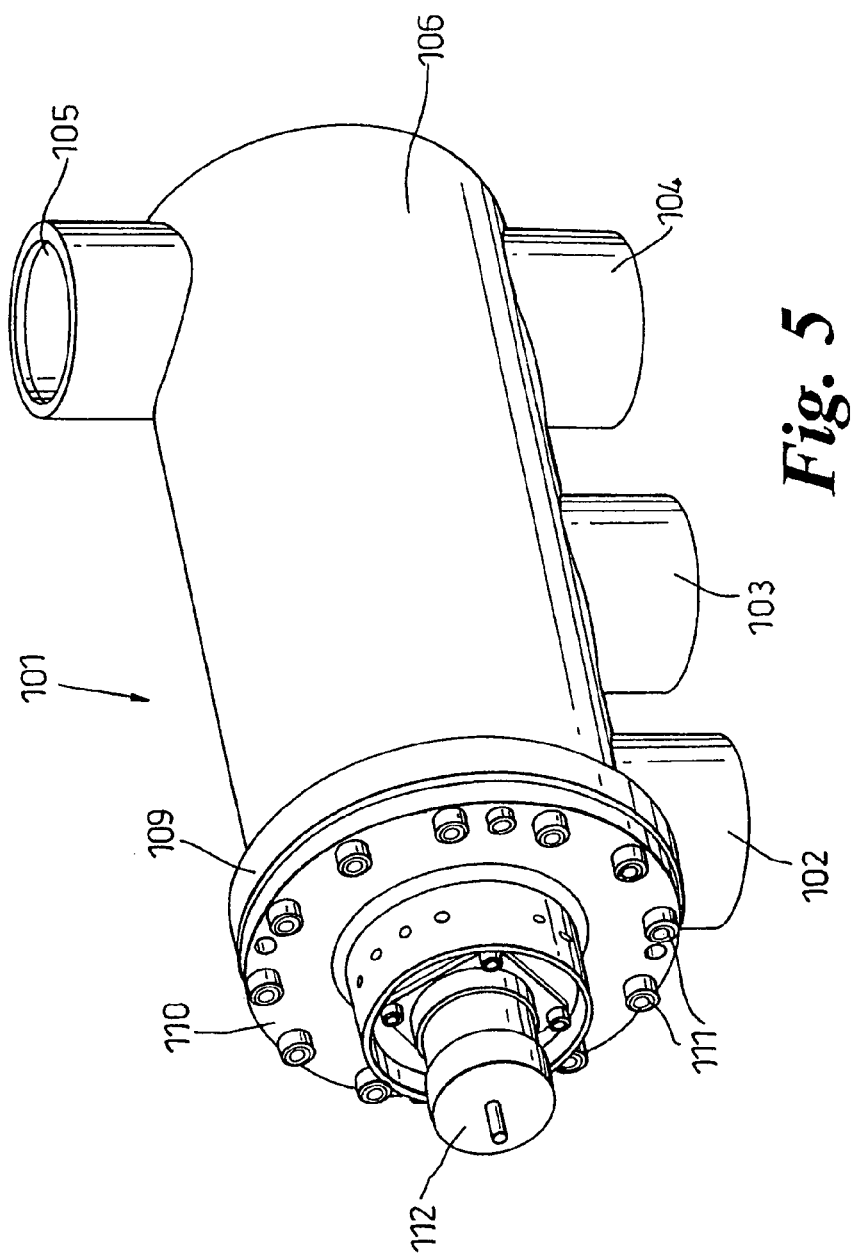
FIG. 5 is a perspective view of a thermostatic mixing valve according to a second embodiment of the invention.
Figure 6:
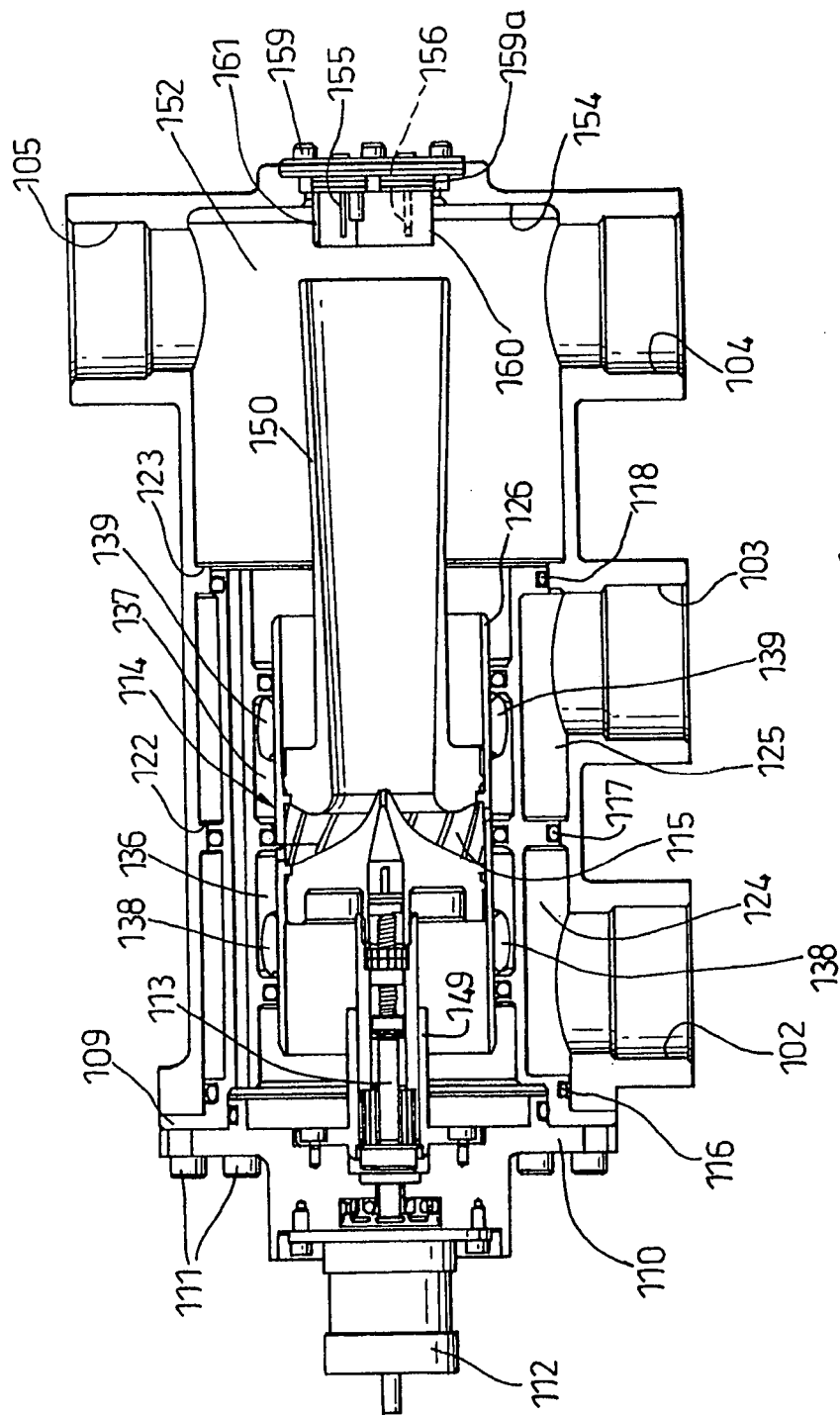
FIG. 6 is a longitudinal section through the valve of FIG. 5.
Figure 7:
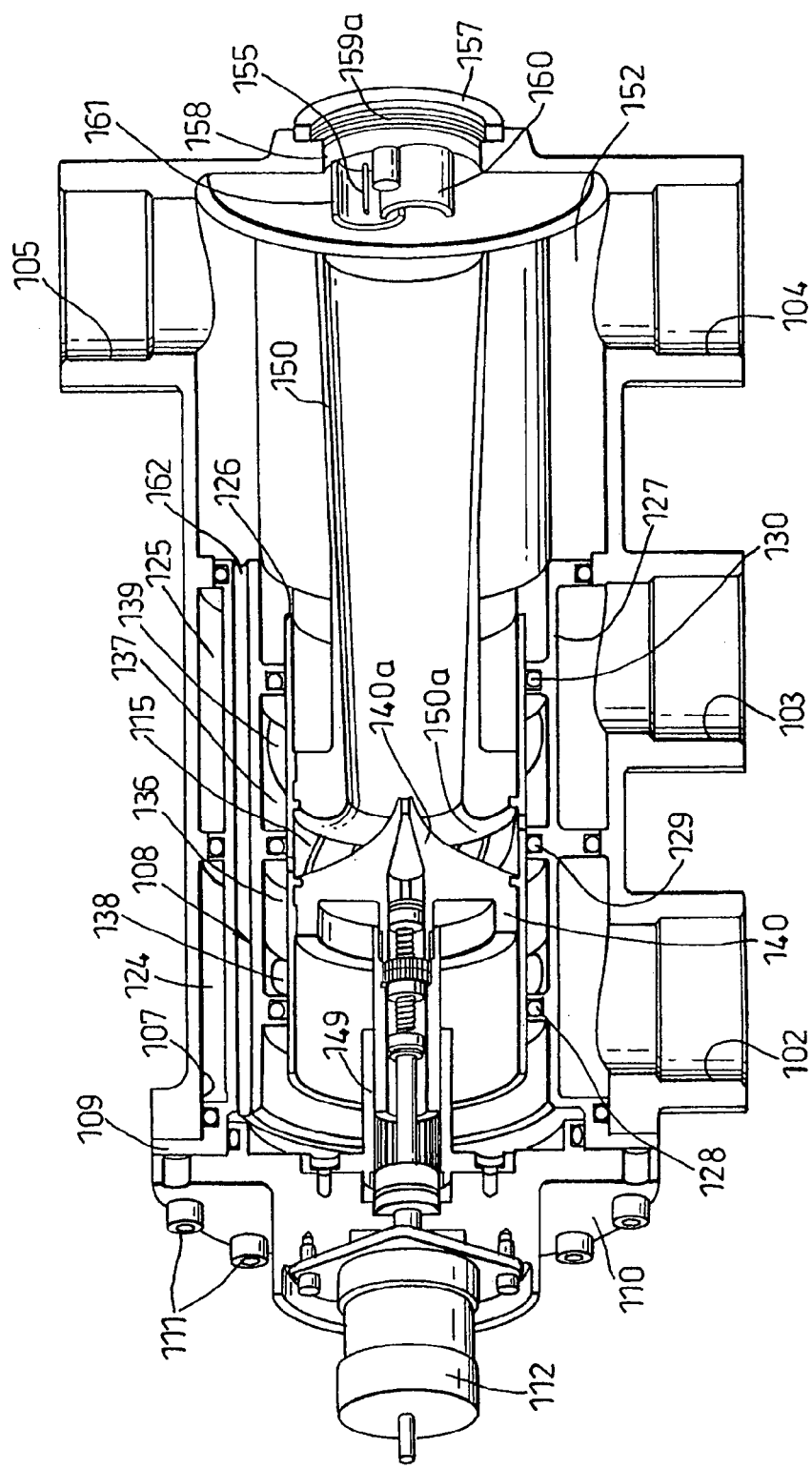
FIG. 7 is longitudinal section through the valve of FIG. 5 in part isometric projection.
Figure 8:
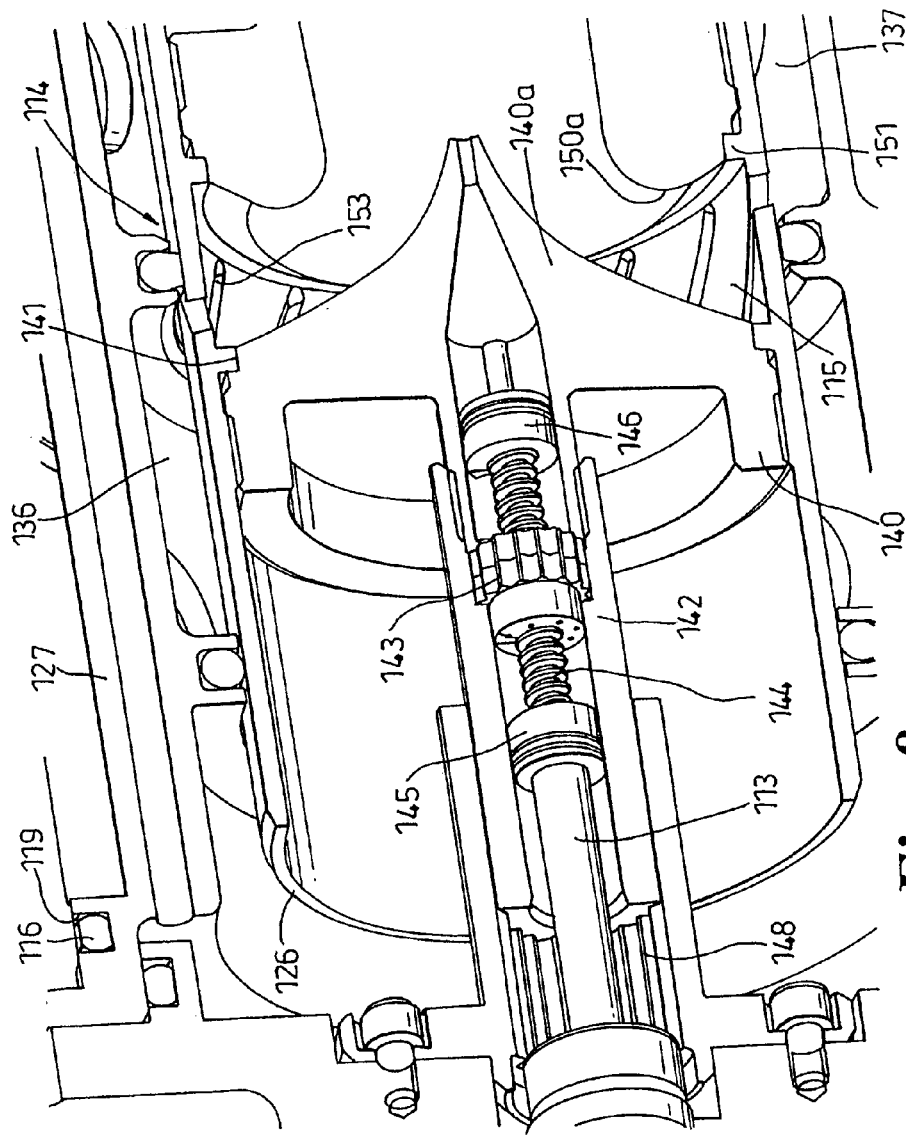
FIG. 8 is an isometric sectioned view of part of the valve shown in FIG. 6 as viewed from the left hand end of FIG. 6.
Figure 9:
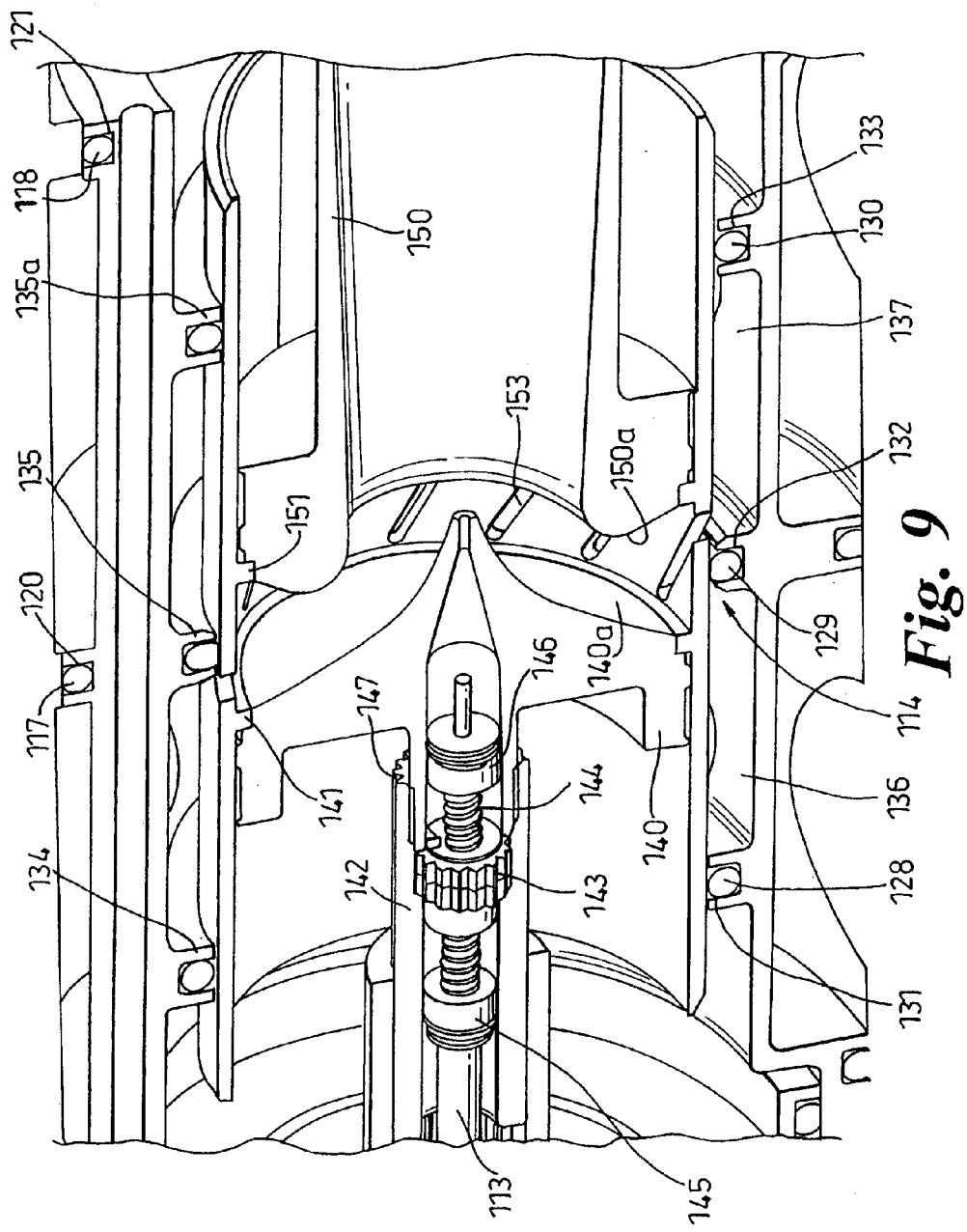
FIG. 9 is an isometric sectioned view of part of the valve shown in FIG. 6 as viewed from the right hand end of FIG. 6.
Figure 10:
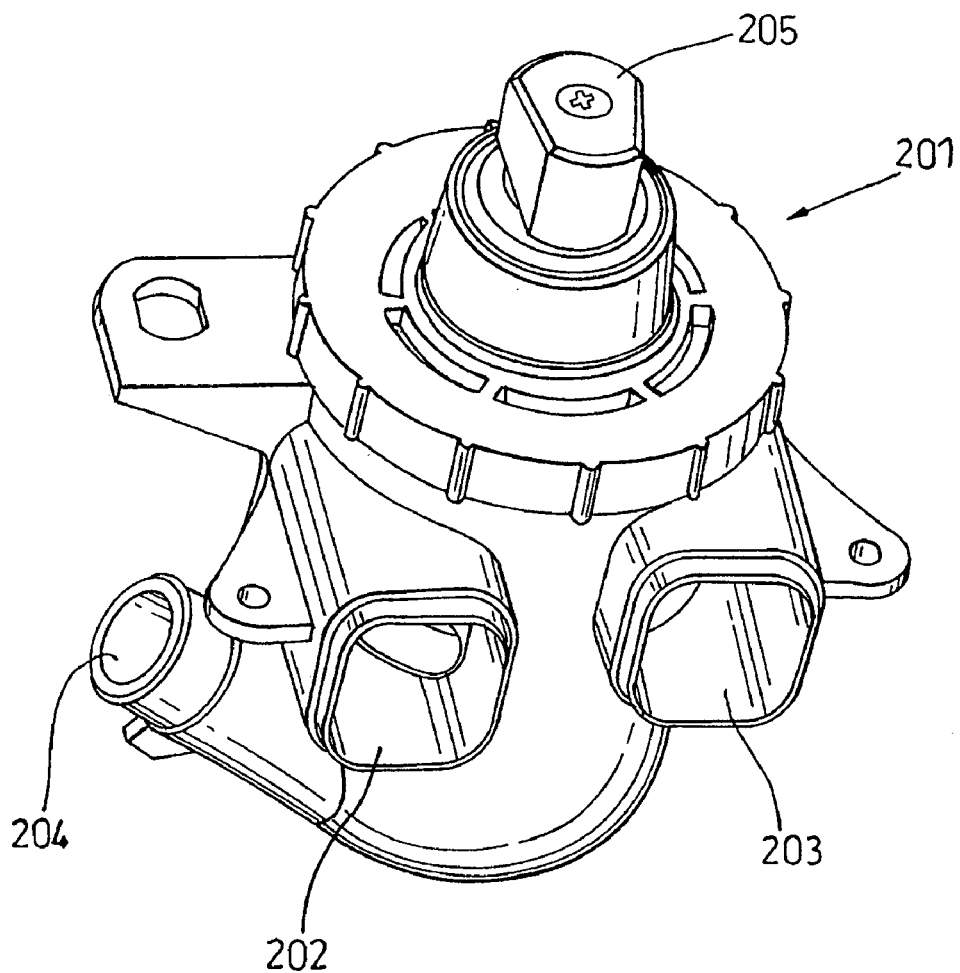
FIG. 10 is a perspective view of a thermostatic mixing valve according to a third embodiment of the invention.

With particular reference now to FIGS. 3 and 4, the flow control mechanism includes a separate flow control valve 18,19 for each supply. Each valve 18,19 is similar and comprises an assembly of three ceramic discs 20,21,22. The outer discs 20,21 are fixed and the centre disc 22 is movable relative thereto to vary the overlap of openings in the discs to control the flow through the valve. For the purposes of illustration, the valve 18 is shown fully open and the valve 19 is shown fully closed. It will be understood, however, that in use both valves 18,19 are assembled to open and close at the same time.

Each valve 18,19 is operatively connected to the control ring 9 by a gear drive 23,24 for reciprocating movement of the associated centre disc 22 relative to the outer discs 20,21 in response to rotation of the control ring 9 in opposite directions. The gear drives 23,24 are linked to the control ring 9 for simultaneous adjustment to open and close both valves 18,19 in a synchronised manner. In this way, the selected temperature is substantially unaffected by adjustment of the valves 18,19 to increase/decrease the total flow of water through the valve 1.

The temperature control mechanism includes a proportioning shuttle valve 25 for controlling the relative proportions of hot and cold water admitted to an annular mixing chamber 26. The temperature control mechanism also includes a wax thermostat 27 arranged to sense the temperature of the mixed water and adjust the shuttle valve 25 to maintain a selected temperature substantially constant.

The shuttle valve 25 comprises a pair of shuttle valve members 28,29 mounted on the thermostat 27 and secured by a nut 30 screwed onto the thermostat 27. Each valve member 28,29 has an annular seal face 31,32 arranged to co-operate with opposed annular seal faces 33,34 of an annular valve seat 35 positioned between the seal faces 31,32.

The valve members 28,29 are fixed relative to each other and are axially movable together relative to the valve seat 35 between a first end position and a second end position. In the first end position, the valve member 28 engages the valve seat 35 to shut-off the flow of cold water. In the second end position, the valve member 29 engages the valve seat 35 to shut-off the flow of hot water. Between the end positions, the valve members 28,29 are spaced from the valve seat 35 to control the relative proportions of hot and cold water admitted to the mixing chamber 26 according to the axial position of the valve members 28,29.

The valve seat 35 comprises a thin metal washer coated on both sides with a layer of rubber or similar elastomeric material. In this way, the seal faces 33,34 are resilient for engagement with the seal faces 31,32 of the shuttle valve members 28,29. As a result, fluid tight engagement of the valve members 28,29 with the valve seat 35 is assured in each of the end positions.

The thermostat 27 contains a wax filler and has an actuator rod 36 that is axially movable in response to expansion/contraction of the wax filler in response to temperature of the mixed water sensed by the thermostat 27.

The free end of the rod 36 engages a cap 37 biased towards the rod 36 by an overload spring 38 acting between the cap 37 and the inner end of a sleeve member 39 screwed into a threaded bore 40 at the inner end of the drive spindle 6. The cap 37 and overload spring 38 are retained in the sleeve member 39 by an end stop in the form of a U-shaped wire clip 37a inserted through holes (not shown) in the sleeve member 39 to locate the cap 37 in a pre-loaded state.

The sleeve member 39 is axially slidable in the shuttle valve member 29 and is located against rotation so as to be axially movable in response to rotation of the drive spindle 6 by user actuation of the control knob 5. In this way, axial movement of the sleeve member 39 in response to user selection of the desired water temperature is transmitted to the shuttle valve members 28,29 via the thermostat 25. As a result, the position of the valve members 28,29 relative to the valve seat 35 is adjusted to vary the relative proportions of hot and cold water admitted to the mixing chamber 26 to produce mixed water having the selected temperature.

If the temperature of the mixed water increases, the wax filler expands to increase the projecting length of the actuator rod 36. This causes the thermostat 27 to be displaced axially away from the cap 37 against the biasing of a return spring 41 which is weaker than the overload spring 38.

The thermostat 27 carries with it the shuttle valve members 28,29 causing the seal face 32 to move towards the seal face 34 of the valve seat 35 to reduce the flow of hot water and simultaneously increase the flow of cold water by moving the seal face 31 away from the seal face 33 of the valve seat 35. In this way the relative proportions of hot and cold water admitted to the mixing chamber 26 are adjusted to return the temperature of the mixed water to the selected temperature.

If the temperature of the mixed water exceeds the maximum permitted, for example if cold water supply fails, expansion of the wax filler causes the valve member 29 to engage the valve seat 35 to shut-off the flow of hot water. Further elongation of the actuator rod 36 is accommodated by compression of the overload spring 38 to prevent damage to the internal components of the cartridge unit 14.

If the temperature of the mixed water decreases, the wax filler contracts and the thermostat 27 is displaced axially towards the cap 37 reducing the projecting length of the rod 36 under the biasing of the return spring 41.

As a result of this movement, seal face 32 of shuttle member 29 moves away from seal face 34 of the valve seat 35 to increase the flow of hot water and simultaneously the flow of cold water is reduced by seal face 31 of shuttle member 28 moving towards the seal face 33 of the valve seat 35. In this way the relative proportions of hot and cold water admitted to the mixing chamber 26 are adjusted to return the temperature of the mixed water to the selected temperature.

As best shown in FIGS. 3 and 4, each flow control inlet valve 18,19 leads to a two-stage plenum chamber 42,43 respectively. Each plenum chamber 42,43 is divided internally into concentric annular outer and inner chambers 42a, 43a and 42b, 43b by an axially extending partition wall 44. In this embodiment, the partition wall 44 and valve seat 35 are integrated in a single component by using the valve seat 35 as an insert in a plastic moulding die for the partition wall 44. In this way, the valve seat 35 is an integral part of the cartridge body.

One end of the partition wall 44 forms a weir 45 separating the chambers 42a, 42b and the other end forms a weir 46 separating the chambers 43a, 43b. The weir 45 is axially spaced from the point of entry of cold water to the outer chamber 42a and the point of exit of cold water from the inner chamber 42b. Likewise, the weir 46 is axially spaced from the point of entry of hot water to the outer chamber 43a and the point of exit of hot water from the inner chamber 43b.

In this way, the incoming water to each plenum chamber 42,43 is distributed around the outer chamber 42a,43a and is confined to flow in an axial direction towards the associated weir 45,46 where it flows over the weir 45,46 into the inner chamber 42b,43b and is again confined to flow in an axial direction towards the valve seat 35 where it flows into the mixing chamber 26.

As a result, the water flows are uniformly distributed around the shuttle valve members 28,29 and swirling flow vectors are reduced to substantially insignificant values as the water approaches the valve seat 35. The velocity vectors as the water approaches the valve seat 35 are substantially axial and the flow velocities across the valve seat 35 are radially inwards and even all around the valve seat 35.

In this way, the distribution of water volume and velocity energy is even around the valve seat 35 for both flows. As a result, the plenum chambers 42,43 provide substantially identical mixing conditions around the porting of the shuttle valve members 28,29 that prevents asymmetric flow patterns developing to any significant extent as the hot and cold water flows enter the mixing chamber 26.

Each shuttle valve member 28,29 is sealed relative to the cartridge body by an O-ring 47,48 respectively to close-off the inner chambers 42b,43b. The diameter of the O-rings 47,48 is matched to that of the valve seat 35 so that the inlet water pressure exerts no resultant force on the shuttle valve 25. The O-rings 47,48 also act to provide a guidance system for axial movement of the shuttle valve 25 that maintains the alignment of the shuttle valve 25 relative to the valve seat 35.

In this way, the seal faces 31,32 of the shuttle valve members 28,29 are maintained square to the seal faces 33,34 of the valve seat 35. This further contributes to producing substantially identical mixing conditions around the porting of the shuttle valve members 28,29 that prevents asymmetric flow patterns developing to any significant extent as the water flows enter the mixing chamber 26.

In addition to providing a uniform distribution of water volume and velocity energy of the water flows, the arrangement of the valve seat 35 between the seal faces 31,32 of the shuttle valve members 28,29 provides porting that enables the water flows to enter the mixing chamber 26 close together. As a result, the flows meet radially inwardly of the valve seat 35 and are swept into an axial direction by curved surfaces 28a,29a of the shuttle valve members 28,29. In this way, interaction between the flows is enhanced to promote thorough mixing of the water around the valve seat 35 and the formation of separate streams of water having different temperatures is substantially eliminated.

Moreover, velocity energy generated is maintained by matching the cross-sectional area of the mixing chamber 26 perpendicular to the direction of flow to the combined cross-sectional area of the hot and cold flows across the valve seat 35. As a result, turbulent flow conditions are created within the mixing chamber 26 over the normal flow rates. Turbulent flow has numerous random eddies which give rise to random lateral flows throughout the water stream that cause the hot and cold flows to merge producing a fully blended flow within a relatively short axial distance.

More particularly, we have found that if the cross-sectional area of the mixing chamber 26 is 1 to 1½ times the combined cross-sectional area of the hot and cold flows across the valve seat 35, substantially complete mixing of the hot and cold flows is achieved if the length of the mixing chamber 26 is approximately 5 times the width.

In this embodiment, the diameter of the shuttle valve 25 is large relative to the operating stroke (or valve lift) and the mixing chamber 26 has a relatively small width. This results in a compact size of mixing chamber 26 that further promotes mixing of the water flows.

In addition, the mixing chamber 26 provides substantially unobstructed flow of water and can be slightly tapered to increase gradually the cross-sectional area in the direction of flow. As a result, some of the velocity energy may be recovered and converted into pressure energy for the mixed water discharged from the outlet 4.

Furthermore, in the circumstances where one of the flows has a higher pressure, the higher pressure flow creates a low pressure region immediately inside the mixing chamber causing the lower pressure flow to increase and so assist the response of the thermostat 27 to maintain the selected temperature.

Thus, in the event the hot water pressure is higher, the flow of hot water into the mixing chamber 25 is turned from a radial inward direction to an axial direction by curved surface 29a. This creates a low pressure region causing the cold water flow to become entrained in the hot water flow, mixing with it and tending to maintain the initial proportions of hot and cold water.

Alternatively, if the cold water pressure is higher, the flow of cold water into the mixing chamber 25 clings to the curved surface 28a due to the Coanda effect and is turned into an axial direction. This creates a low pressure region causing the hot water flow to become entrained in the cold water flow, mixing with it and tending to maintain the initial proportions of hot and cold water.

The mixed water leaving the mixing chamber 25 flows over the temperature responsive part 27a of the thermostat 27. The thermostat 27 is exposed to water that is fully blended thereby improving the accuracy of response to change in temperature of the blended water. More particularly, we have found that temperature deviations from the desired temperature are reduced by approximately 50% to 70% compared to existing mixer valves in which the hot and cold water flows are not fully blended. Also the speed of response to sudden temperature changes is similarly improved.

An opening 49 in the inner end of the cartridge unit 14 allows the mixed water to flow into an outlet chamber 50 defined between the cartridge unit 14 and the valve body 12. The outlet chamber 50 communicates with the outlet 4 for discharge of temperature controlled water to an ablutionary appliance such as a shower handset (not shown) connected to the outlet via a flexible hose (not shown).

Referring now to FIGS. 5 to 9 of the drawings, there is shown an electronically controlled thermostatic mixing valve 101 according to a second embodiment of the present invention. The mixing valve 101 has spaced parallel inlets 102,103 for connection to supplies of hot and cold water (not shown) and two outlets 104,105 for discharging temperature controlled blended water. The outlets 104,105 are spaced apart 180° for selective connection to an ablutionary appliance such as a shower spray fitting.

The mixing valve 101 may be provided in a range of sizes for different applications. For example, smaller valves may supply a single shower or a group of showers. Larger valves may be connected in a water circulation system to provide a hot water circuit around a building in which the water is maintained at a constant temperature and can be supplied to a large number of appliances at different locations.

The valve 101 has a cylindrical body 106 with the outlets 104,105 at one end and an opening 107 at the other end for reception of a cartridge unit 108.

The cartridge unit 108 is a push fit in the body 106 and has an external flange 109 that locates against the end of the body 106. The cartridge unit 108 is releasably secured by an end plate 110 bolted to the body 106 by a plurality of bolts 111 extending through aligned holes in the flange 109 to engage tapped holes (not shown) in the body 106.

The flange 109 carries a stepper motor 112 having a rotatable drive shaft 113 for actuating a spool valve 114 to vary the relative proportions of hot and cold water admitted to an annular mixing chamber 115 within the cartridge unit 108 as described later herein.

The cartridge unit 108 is sealed relative to the body 106 by three axially spaced O-rings 116,117,118 located in annular grooves 119,120,121 respectively.

The O-ring 116 engages the inner surface of the body 106 adjacent the opening 107. The O-ring 117 is of smaller diameter and engages an internal rib 122 axially spaced from the opening 107. The O-ring 118 is of smaller diameter still and engages an internal rib 123 axially spaced from the rib 122. The arrangement of the O-rings to be of progressively smaller diameter from the outer end of the cartridge unit 108 to the inner end facilitates insertion of the cartridge unit 108 in the body 106. Thus, the O-ring 118 is a clearance fit in the body 106 until it engages rib 123 and O-ring 117 is a clearance fit until it engages rib 122.

The cartridge unit 108 defines with the body 106 two annular outer chambers 124,125 separated by the O-ring 117. The inlet 102 opens to the chamber 124 and the inlet 103 opens to the chamber 125. Each chamber 124,125 is of similar size and shape and the inlets 102,103 are arranged in parallel on the same side of the body 106. In this way, water flowing into the chambers 124,125 is distributed around the chambers 124,125 and any asymmetry in the distribution will be the same in each chamber 124,125.

The spool valve 114 comprises a cylindrical spool sleeve 126 received in a cylindrical body 127 of the cartridge unit 108. The spool sleeve 126 is sealed relative to the body 127 by three axially spaced O-rings 128,129,130 located in annular grooves 131,132,133 formed in internal ribs 134, 135,135a on the inside of the body 127.

The spool sleeve 126 defines with the body 127 two annular inner chambers 136,137 concentric with the outer chambers 124,125 and separated by O-ring 129. Each chamber 136,137 is of similar size and shape.

The outer chamber 124 communicates with the inner chamber 136 via a series of holes 138 formed in the body 127. The holes 138 are circumferentially spaced apart and offset relative to the inlet 102 so that water flowing into the outer chamber 124 is prevented from flowing directly into the inner chamber 136 and is confined to flow around the outer chamber 124.

The outer chamber 125 similarly communicates with the inner chamber 137 via a series of holes 139 formed in the body 127. The holes 139 are circumferentially spaced apart and offset relative to the inlet 103 so that water flowing into the outer chamber 125 is prevented from flowing directly into the inner chamber 137 and is confined to flow around the outer chamber 125.

The spool sleeve 126 is provided with an internal hub 140 seated against an internal rib 141 and secured by adhesive, welding or other suitable means. Attached to the hub 140 by a screw thread is a rearwardly extending tubular portion 142 to locate axially a drive nut 143 threadably engaging a lead screw portion 144 of drive shaft 113 between a pair of stops 145,146.

The tubular portion 142 is located against rotation and guided for axial sliding movement by engagement of external axial splines 147 with internal axial splines 148 of a tubular portion 149 secured to the end plate 110. In this way, the spool sleeve 126 is axially movable in response to rotation of the drive shaft 113 between end positions defined by engagement of the drive nut 143 with the stops 145,146.

The spool sleeve 126 is also provided with a tubular spout 150 seated against an internal rib 151 and secured by adhesive, welding or the like. The spout 150 extends away from the hub 140 and terminates in an outlet chamber 152 communicating with the outlets 104,105.

The spool sleeve 126 is formed with a series of slots 153 uniformly spaced apart in a circumferential direction and extending between the internal ribs 141,151 at an angle relative to the longitudinal axis of the spool sleeve 126.

The O-ring 129 engages the spool sleeve 126 in the region of the slots 153 whereby water can flow from each inner chamber 136,137 into the mixing chamber 115 via the exposed portion of the slots 153. In this way, axial movement of the spool sleeve 126 in response to rotation of the drive shaft 113 under the control of the motor 112 alters the area of the slots 153 communicating with the chambers 136,137 to adjust the relative proportions of water admitted to the mixing chamber 115 from each chamber 136,137. The shape of the slots 153 may be adapted to profile the rate of proportioning of hot and cold water according to the axial position of the spool sleeve 126.

The outer end of the spout 150 is spaced from end wall 154 of the body 106 opposite a pair of temperature sensors 155,156 mounted on a plug 157 secured in an opening 158 in the end wall 154 by a plurality of bolts 159 and sealed by an O-ring 159a.

Water flowing from the mixing chamber 115 into the outlet chamber 152 passes over the temperature sensors 155,156 and is swirled around in the outlet chamber 152 by a pair of guide vanes 160,161 mounted on the plug 157 to force the water to impart a rotation to the water stream entering the outlet chamber 152.

The temperature sensors 155,156 provide signals representative of the temperature of the water leaving the mixing chamber 115 to a microprocessor or other suitable control system (not shown) which in turn generates a control signal for actuating the stepper motor 112 to adjust the spool valve 114 to control the relative proportions of water admitted to the mixing chamber 115 in accordance with the desired outlet water temperature.

An axial control hole 162 through the body 127 of the cartridge unit 113 connects each end of the spool valve 114 to the water pressure in the outlet chamber 152 so that pressure forces acting on the spool sleeve 126 are balanced and there is no net force tending to displace the spool sleeve 126 in an axial direction.

In use, the inlets 102,103 are connected to supplies of hot and cold water via on/off valves (not shown) that may also be adjustable to vary the flow similar to the ceramic plate valves of the first embodiment. Alternatively the on/off and flow control functions may be provided by separate components.

The waterways are of similar size and shape whereby the connections to the inlets 102,103 may be reversed without altering the operation and performance of the valve 101.

The incoming water flows enter the outer chambers 124,125 where they are forced to flow around the chambers 124,125 by the offset arrangement of the inlets 102,103 relative to the holes 138,139 connecting the outer chambers 124,125 to the inner chambers 136,137.

The holes 138,139 open into the inner chambers 124,125 at the end spaced from the slots 153. As a result, the water entering the inner chambers 136,137 is turned from a radial direction into an axial direction to flow towards the slots 153. In this way, the water flows are distributed uniformly and evenly around the spool sleeve 126 before arriving at the slots 153. If, however, any asymmetry remains in the flows, it will be similar for each flow and produce matching ratios of hot and cold around the spool sleeve 126 even if the total flow distribution is asymmetric.

The water arriving at the slots 153 flows into the mixing chamber 115 in a radial inwards direction and is swept into an axial direction between curved surfaces 140a and 150a of the hub 140 and spout 150 respectively. As in the previous embodiment, both flows enter the mixing chamber 115 close together and the curved surfaces 140a,150a guide the flows to entrain one another. As shown, the centre of the mixing chamber 115 is tapered away leading into the spout 150 and the total flow path through the mixing chamber 115 and spout 150 is designed to create turbulent flow over a distance sufficient to ensure substantially complete mixing of the flows occurs before the water stream reaches the temperature sensors 155,156.

More particularly, the mixing chamber 115 has a cross-sectional area perpendicular to the direction of flow approximately 1 to 1½ times the combined cross-sectional area of the hot and cold flows into the mixing chamber 115. As a result, velocity energy of the flows is maintained creating turbulent flow conditions within the mixing chamber 115 and substantially complete mixing of the hot and cold flows can be achieved if the length of the mixing chamber 115 is approximately 5 to 10 times the width.

By angling the slots 153 relative to the longitudinal axis of the spool sleeve 126, the jets of hot and cold water entering the mixing chamber 115 are offset around the circumference of the spool sleeve 126. As a result, the two flows interlace as they enter the mixing chamber 115 which further promotes mixing of the hot and cold water streams.

The spout 150 gradually expands towards the outer end so that the water velocity reduces thereby recovering some of the velocity energy and converting it to pressure energy. This can be beneficial in obtaining good flow rates from small sized mechanisms and may not be required for larger valves.

The temperature sensors 155,156 monitor the temperature of the water stream exiting the spout 150 and send a signal representative of the temperature to the control system e.g. a microprocessor, which in turn actuates the stepper motor 112 to adjust the axial position of the spool sleeve 126 to vary the relative proportions of hot and cold water admitted to the mixing chamber 115 in accordance with the desired water temperature. In this embodiment, the stepper motor 112 provides 1500 steps between end positions of adjustment corresponding to full hot and full cold. In this way, high temperature resolution is obtained for precise control of the desired outlet water temperature.

The spout 150 is made of plastic or other suitable material having a low thermal mass and conductivity. In this way, the temperature of the water stream exiting the spout 150 is substantially unaffected by contact with the spout 150 thereby improving the accuracy of the outlet water temperature detected by the sensors 155,156.

The water flows entering the mixing chamber 115 are thoroughly mixed before reaching the temperature sensors 155,156. As a result, the sensors 155,156 can be small, e.g. thermistors, and sampled temperatures are consistent with the average mixed water stream. In this way a large number of sensors and averaging of the detected temperatures is not required. In this embodiment, two sensors 155,156 are employed as a back-up to enable a sensor that has failed or is not working correctly to be detected by comparing the signals from each sensor 155,156.

As will now be appreciated, each outer chamber 124,125 and associated inner chamber 136,137 forms a two-stage plenum chamber for distributing the water flows around the porting of the spool valve 114 to provide a substantially uniform distribution of the flows entering the mixing chamber 115 similar to the first embodiment.

In addition, the hot and cold water flows enter the mixing chamber 115 close together and are swept in an axial direction that promotes thorough mixing to produce a fully blended stream directed over the temperature sensors 155, 156. The temperature sensors 155,156 can therefore be quick acting to provide rapid response of the control system to change in the desired water temperature.

In a modification (not shown), the plug 157 is provided with a position sensor to provide a signal to the control system representative of the position of the spool sleeve 126. Position feedback may be employed if the incoming water supply pressures are unequal to compensate for increased gain of the valve and provide accurate temperature control near to the limiting position of the spool sleeve 126 at which the gain is most noticeable.

Referring now to FIGS. 10 to 14 of the accompanying drawings, a thermostatic mixing valve 201 according to a third embodiment of the present invention is shown. The valve 201 has inlets 202,203 for connection to supplies of hot and cold water (not shown) and an outlet 204 for discharging temperature controlled water to an ablutionary appliance such as a shower (not shown).

The valve 201 has a drive spindle 205 for mounting a rotatable temperature control knob (not shown) for user selection of a range of outlet water temperatures, for example from cold to 60° C.

Figure 11:
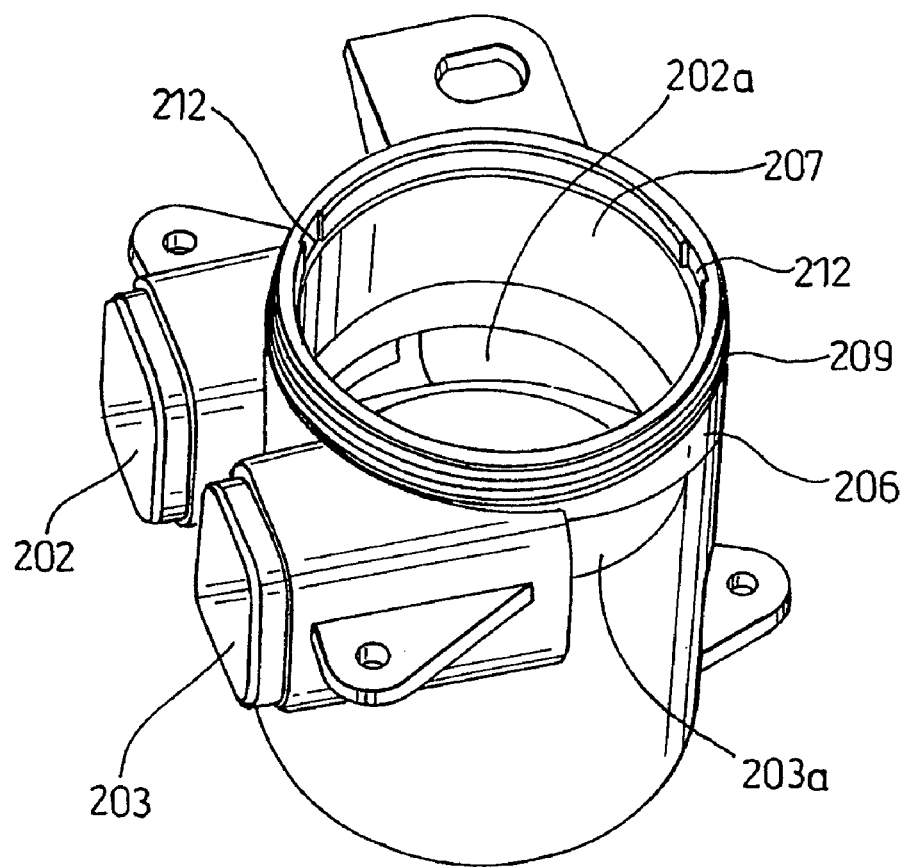
FIG. 11 is a perspective view of the body of the valve shown in FIG. 10 with the cartridge unit removed.
Figure 12:
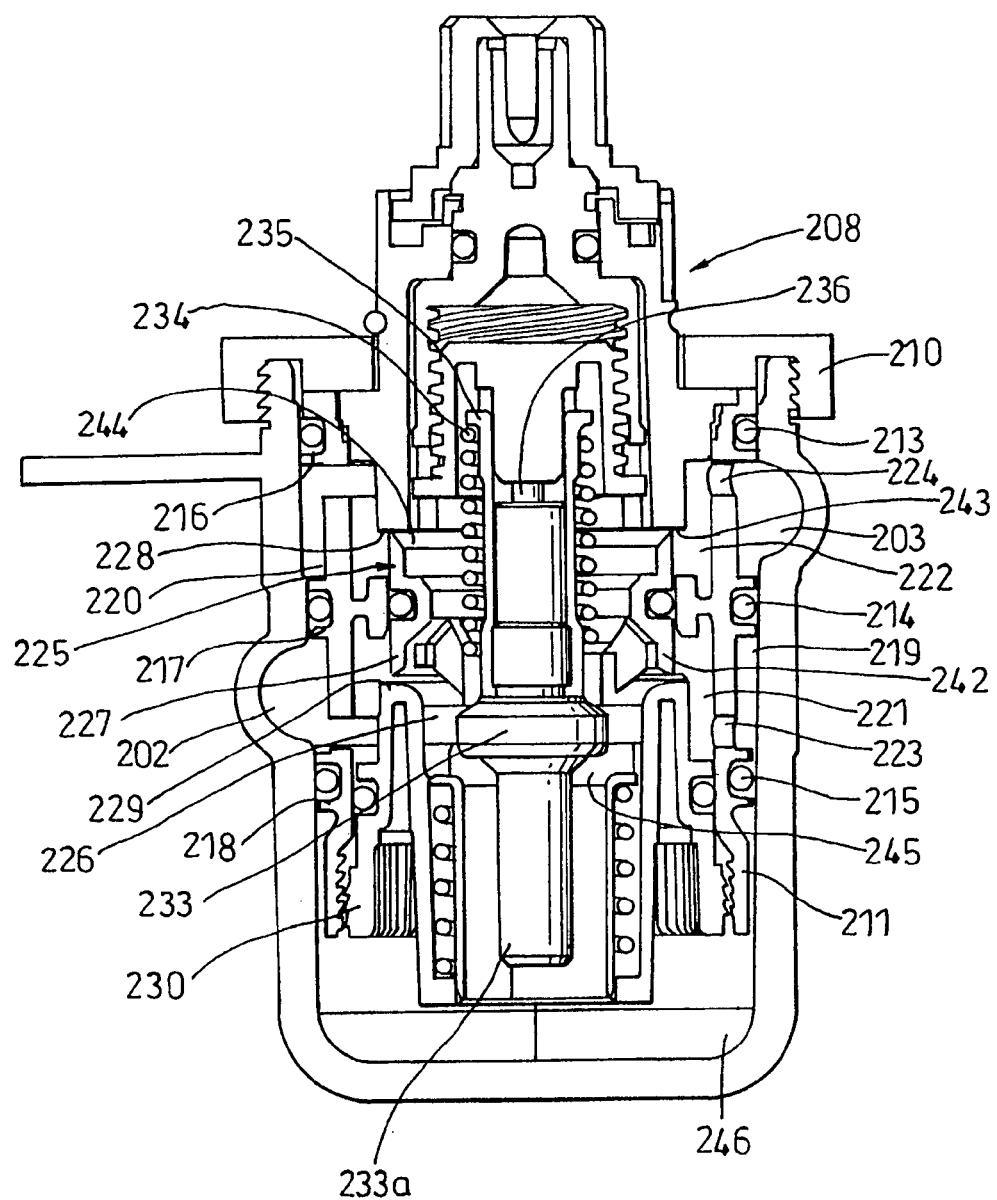
FIG. 12 is a longitudinal section through the valve shown in FIG. 10.
Figure 13:
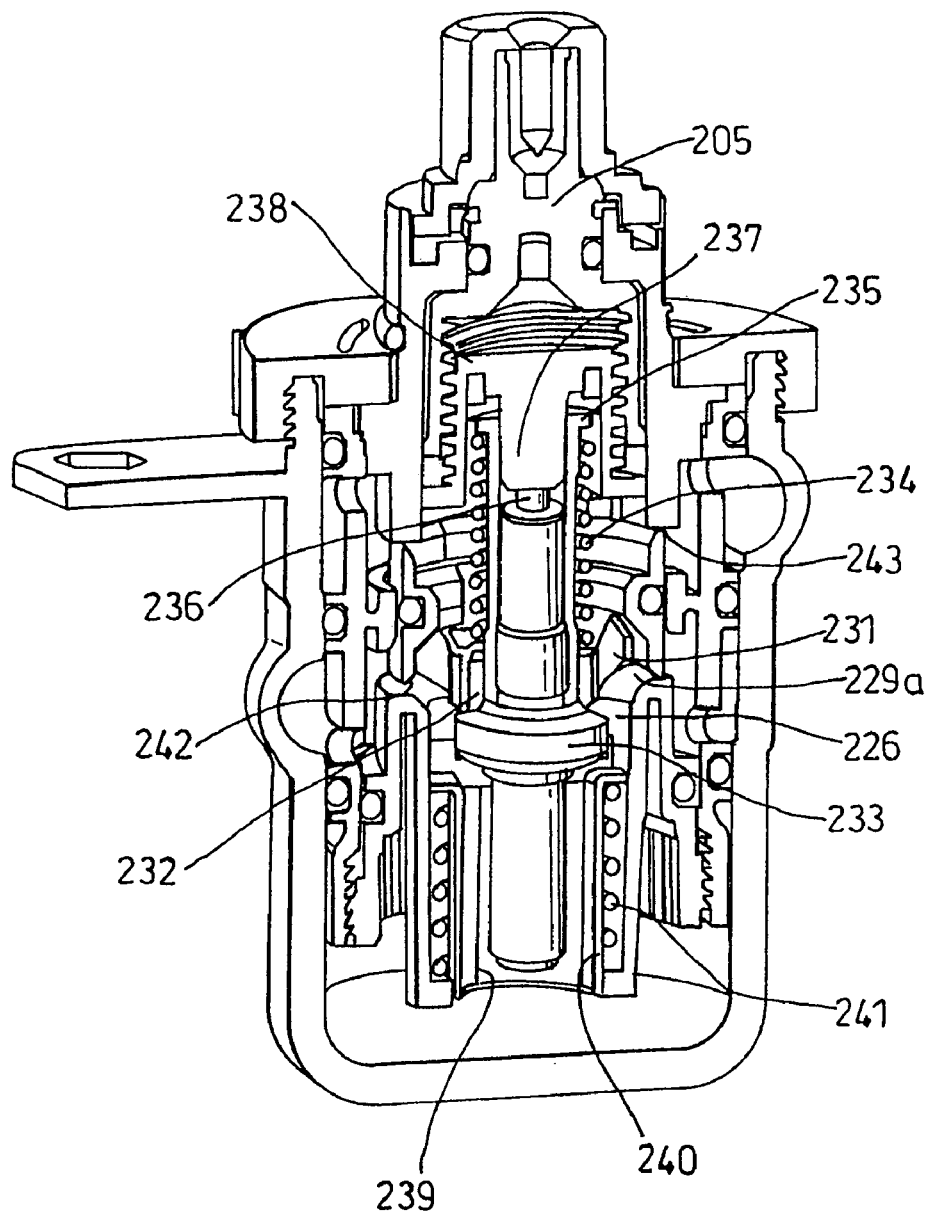
FIG. 13 shows the section of FIG. 12 in part isometric projection.

As best shown in FIG. 11, the valve 201 has a body 206 with a cylindrical bore 207 for reception of a detachable cartridge unit 208 shown in FIGS. 12 and 13.

The body 206 has an external screw thread 209 at the open end of the bore 207 for engagement of a retainer ring 210 to secure the cartridge unit 208 in the body 206.

The cartridge unit 208 is located in the correct orientation and prevented from rotating in the bore 207 by engagement of lugs (not shown) on the cartridge body 211 with a pair of diametrically opposed notches 212 in the body 206 of the valve at the open end of the bore 207.

The cartridge unit 208 is sealed relative to the bore 207 of the valve body 206 by three axially spaced O-rings 213, 214,215 located in annular grooves 216,217,218 in the outer surface of the cartridge body 211 to form two annular outer chambers 219,220 separated by the O-ring 214.

The inlets 202,203 lead to respective spiral ducts 202a, 203a formed in the wall of the valve body 206 that provide tangential entry of the water flow to the outer chambers 219,220. Each outer chamber 219,220 communicates with a respective annular inner chamber 221,222 via a series of circumferentially spaced slots 223,224 formed in the cartridge body 211.

The inner chambers 221,222 are separated by a shuttle valve 225 arranged within the cartridge unit 208 for controlling the relative proportions of hot and cold water admitted from the inner chambers 221,222 to an annular mixing chamber 226.

The shuttle valve 225 includes a shuttle 227 axially movable between annular valve seats 228,229. The cold water valve seat 228 is fixed and the hot water valve seat 229 is provided by an insert 230 screwed into the end of the cartridge body 211. In this way, the axial position of the hot seat 229 can be adjusted to vary the travel of the shuttle 227 for different operating requirements.

Figure 14:
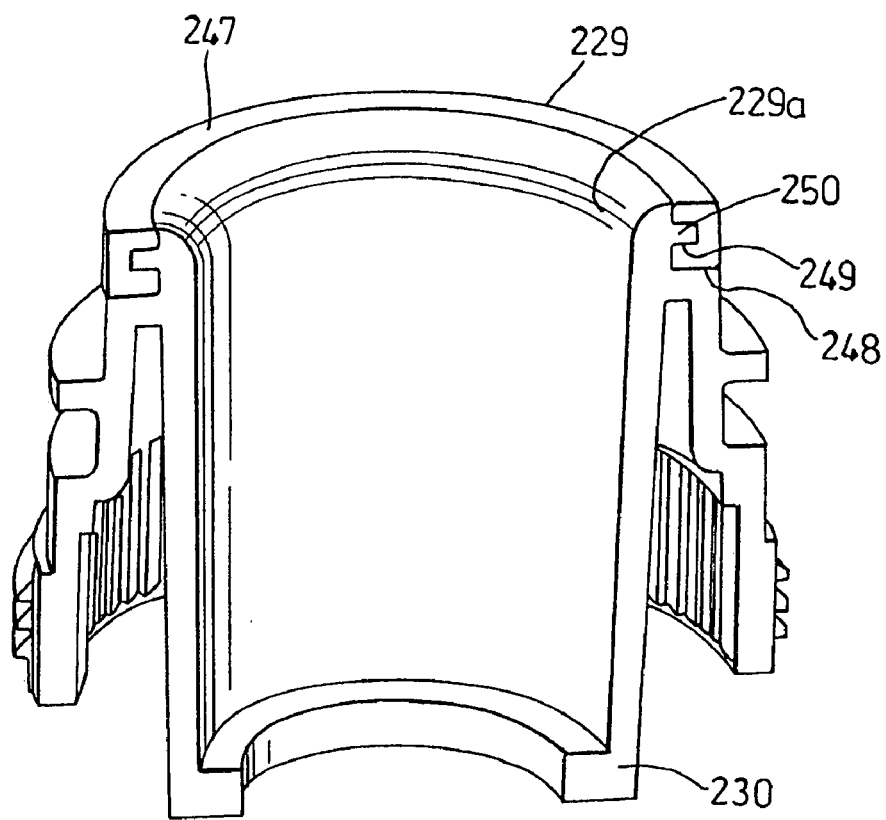
FIG. 14 is a section of the hot seat insert of the valve shown in FIGS. 10 to 13 in part isometric projection.
Figure 15:
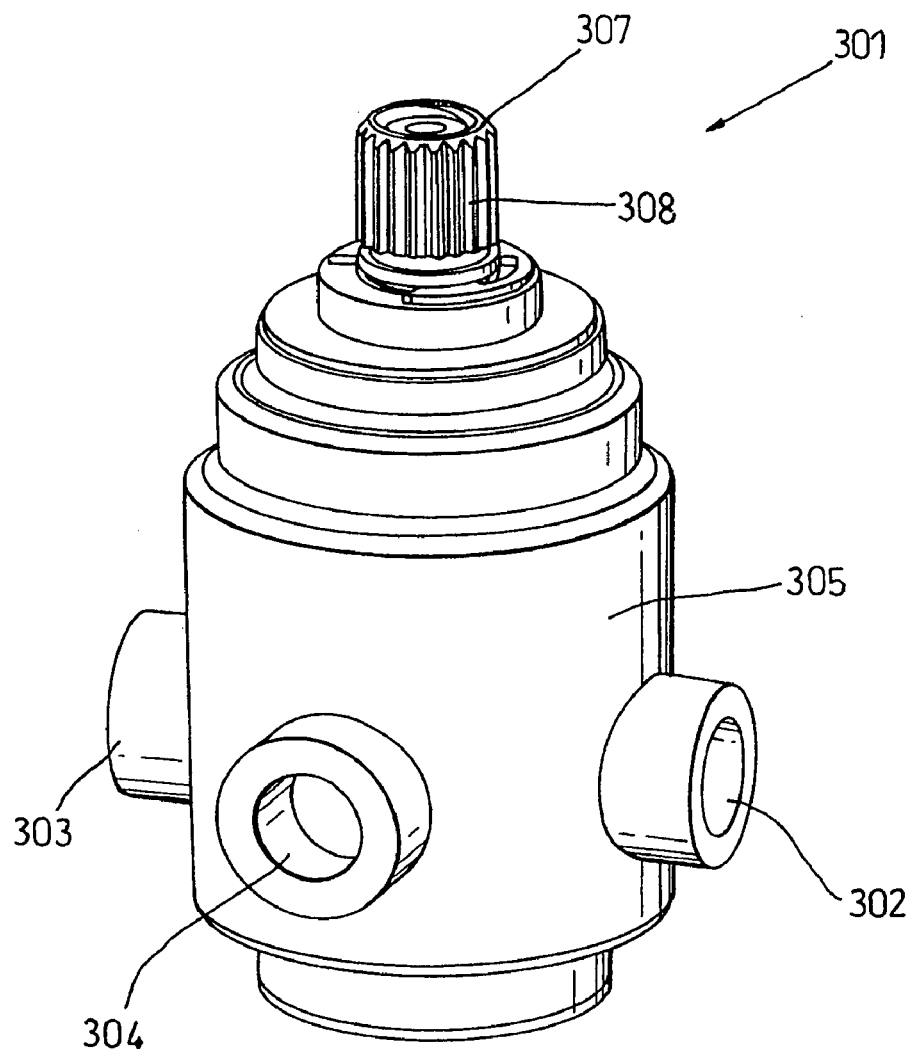
FIG. 15 is a perspective view of a thermostatic mixing valve according to a fourth embodiment of the invention.
Figure 16:
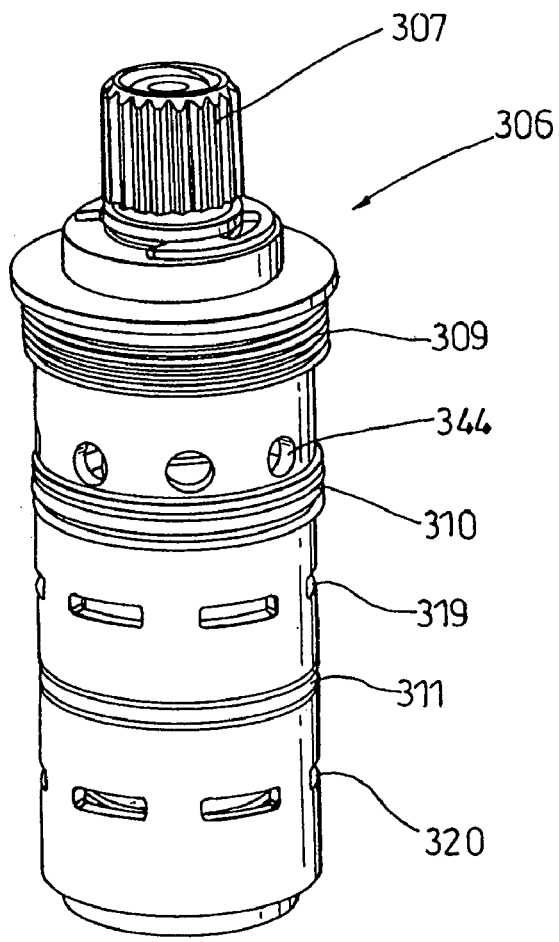
FIG. 16 is a perspective view of the cartridge unit of the valve shown in FIG. 15.
Figure 17:
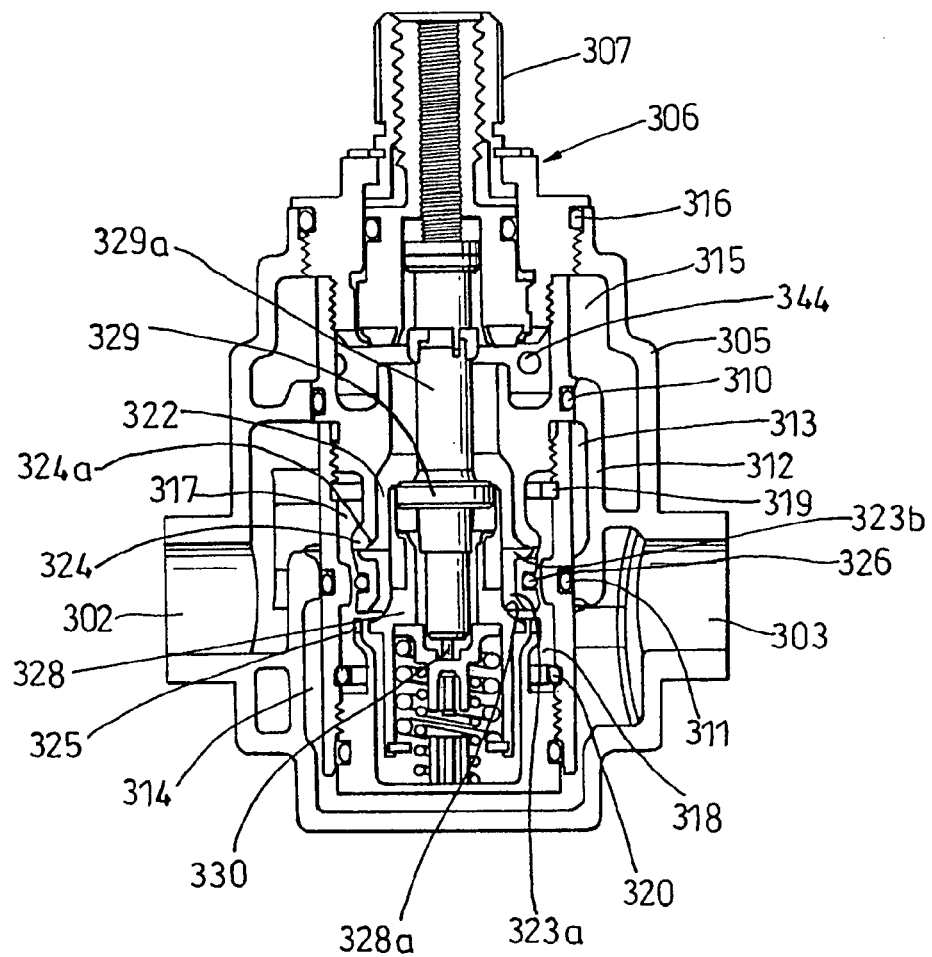
FIG. 17 is a longitudinal section through the inlets of the valve shown in FIG. 15.
Figure 18:
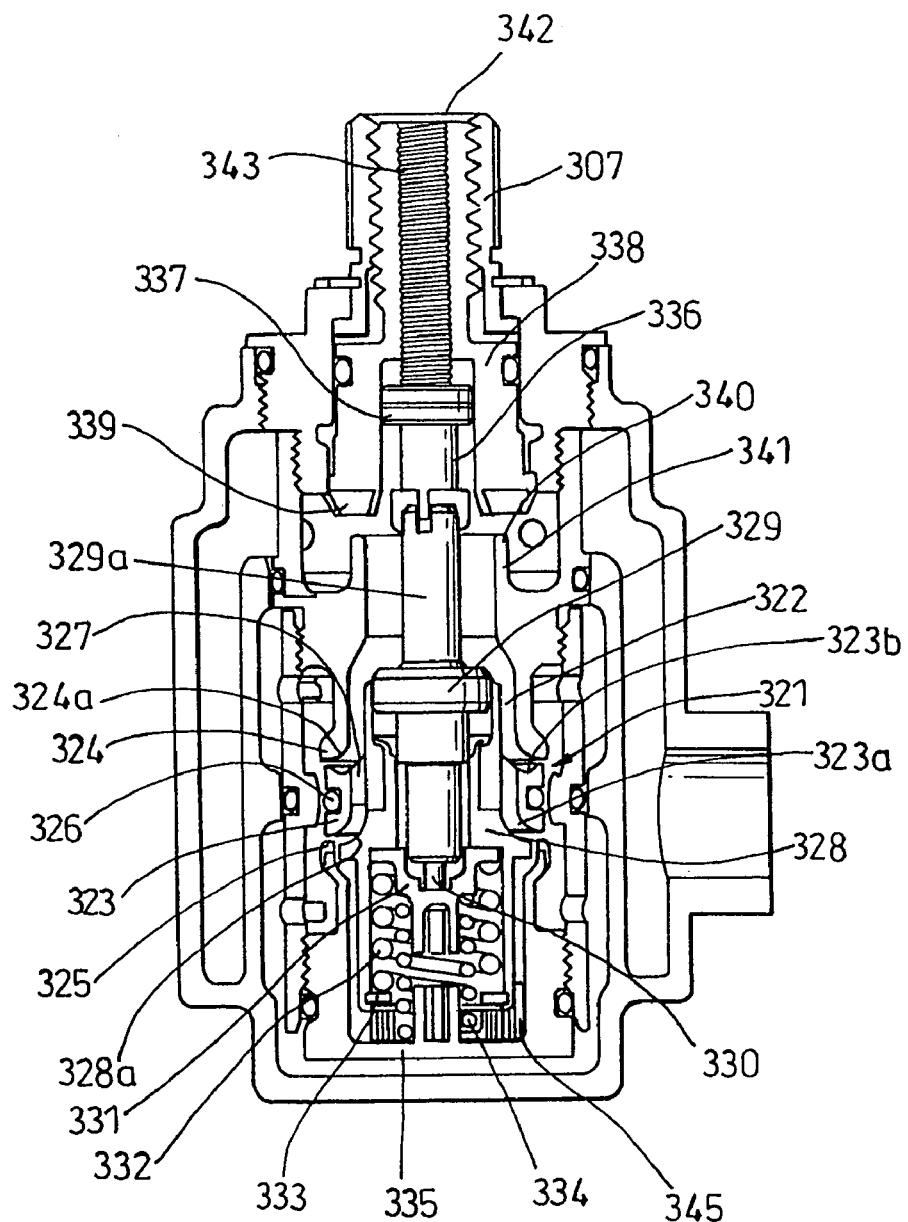
FIG. 18 is a longitudinal section through the outlet of the valve shown in FIG. 17.

As best shown in FIG. 14, the hot seat 229 is formed by an annular rubber ring 247 that is a stretch fit around an external rebate 248 at the inner end of the insert 230 and has an annular groove 249 in the inner marginal surface for reception of a flange 250 to retain the ring 247 in position. The ring 247 is stretched about 5% which holds it in place under all operating conditions and is made of a fairly hard rubber compound to provide a resilient seat for fluid tight engagement with the shuttle 227 to shut-off flow of the hot water under certain operating conditions.

The shuttle 227 is connected by webs 231 to a mounting ring 232 located on a thermostat 233 and is biased by an overload spring 234 acting between the ring 232 and a retainer sleeve 235 screwed onto the thermostat 233. In this way, the shuttle 227 follows movement of the thermostat under normal operating conditions.

The thermostat 233 contains a wax filler and has an actuator rod 236 that is axially movable in response to expansion/contraction of the wax filler in response to the temperature of the mixed water sensed by the thermostat 233.

The free end of the rod 236 engages an axial plug 237 provided on the underside of a drive nut 238. The plug 237 is slidably received in the end of the retainer sleeve 235 and provides an axial guide for one end of the thermostat assembly. The other end of the thermostat assembly is provided with an axial guide in the form of internal webs 239 of a mixed water guide 240 slidably received in the insert 230.

The guide 240 is biased by a return spring 241 towards the thermostat 233 and engages the thermostat 233 via a spacer ring 245 having openings (not shown) for water to flow from the mixing chamber 226 through the guide 240 and into an outlet chamber 246 defined between the cartridge body 211 and the valve body 206. The outlet chamber 246 communicates with the outlet 204 for discharging temperature controller water.

The drive nut 238 is located against rotation in the cartridge body 211 and is screwed into the inner end of the drive spindle 205 such that the drive nut 238 is axially movable in response to user rotation of the control spindle 205.

This axial movement is transmitted via the plug 237 to the thermostat 233 for adjusting the position of the shuttle valve 227 between the hot and cold seats 228,229 to vary the relative proportions of hot and cold water admitted to the mixing chamber 226 in accordance with user selection of the desired outlet water temperature.

If the temperature of the mixed water increases, the wax filler expands to increase the projecting length of the actuator rod 236. This causes the thermostat 233 to be displaced away from the plug 237 against the biasing of the return spring 241 which is weaker than the overload spring 234. The thermostat 233 carries with it the shuttle 227 causing a taper seal face 242 at one end to move towards the hot seat 229 to reduce the flow of hot water and a tapered seal face 243 at the other end to move away from the cold seat 228 to increase the flow of cold water. In this way, the relative proportions of hot and cold water admitted to the mixing chamber 226 are adjusted to return the temperature of the mixed water to the selected temperature.

If the temperature of the mixed water exceeds the maximum permitted, for example if the cold water supply fails, expansion of the wax filler causes the shuttle valve 227 to image the hot seat 228 to shut-off the flow of hot water. Further elongation of the actuator rod 236 is accommodated by compression of the overload spring 234 to prevent damage to the internal components of the cartridge unit 208.

If the temperature of the mixed water decreases, the wax filler contracts and the thermostat 233 is displaced axially towards the plug 237 reducing the projecting length of the rod 236 under the biasing of the return spring 241.

As a result, seal face 243 of the shuttle valve 227 moves towards the cold seat 228 to reduce the flow of cold water and seal face 242 moves away from the hot seat 229 to increase the flow of hot water. In this way, the relative proportions of hot and cold water admitted to the mixing chamber 226 are adjusted to retain the temperature of the mixed water to the selected temperature.

As best shown in FIGS. 12 and 13, incoming water is distributed around the outer chambers 219,220 and flows into the inner chamber 221,222 via the slots 223,224. The slots 223,224 are provided at the ends of the inner chambers 221,222 remote from the hot and cold seats 228,229. As a result, the flow of hot and cold water is confined to flow in an axial direction towards the hot and cold seats 228,229. In this way, the hot and cold water flows are evenly distributed around the inner chambers 221,222 and pass across the hot and cold seats 228,229 in a radial direction.

The cold water flow enters a chamber 244 surrounding the overload spring 234 and is turned in an axial direction towards the mixing chamber 226. The hot water flow to the mixing chamber 226 is turned in an axial direction by the curved inner surface 229a of the hot seat 229. The hot water clings to the surface 229a due to the Coanda effect. As a result, both the hot and cold water flows are turned in the same direction towards the mixing chamber 226 and are uniformly distributed around the thermostat 233 as they enter the mixing chamber 226.

The mixing chamber 226 has a small radial width compatible with the required flow rates so that the two flows are thoroughly mixed in a short axial distance. More particularly, the mixing chamber 226 has a cross-sectional area perpendicular to the direction of flow approximately 1 to 1½ times the combined cross-sectional area of the hot and cold flows into the mixing chamber 226. As a result, velocity energy of the water flows is maintained creating turbulent flow conditions within the mixing chamber 226 and substantially complete mixing of the hot and cold flows can be achieved if the length of the mixing chamber 226 is approximately 5 times the width.

The mixed water stream is then directed over the temperature responsive part 233a of the thermostat 233 by the guide 240. In this way, the thermostat 233 provides a fast, accurate response to change in the desired mixed water temperature. Furthermore, if the hot water pressure is higher than the cold water pressure, a pressure drop is created by the hot water entering the mixing chamber 226 that effectively entrains and assists flow of cold water to assist response of the thermostat 233 to maintain the desired water temperature.

As will be appreciated, each outer chamber 219,220 and associated inner chamber 221,222 forms a two stage plenum chamber for distributing water flows around the shuttle 227. In this way, substantially identical mixing conditions are created around the porting of the shuttle valve 225 that prevent asymmetric flow patterns developing to any appreciable extent as the hot and cold water flows enter the mixing chamber 226.

In addition, the seal faces 242,243 of the shuttle 227 are maintained square to the hot and cold seats 228,229 by the guide system for the thermostat 223. This further contributes to producing substantially identical mixing conditions around the porting of the shuttle valve 225 to reduce development of asymmetric flow patterns in the water admitted to the mixing chamber 226.

Referring now to FIGS. 15 to 18 of the accompanying drawings, there is shown a thermostatic mixing valve 301 according to a fourth embodiment of the present invention.

The mixing valve 301 has separate inlets 302,303 for connection to supplies of hot and cold water (not shown) and an outlet 304 for discharging temperature controlled water to an ablutionary appliance such as a shower (not shown).

The valve 301 has a hollow body 305 in which a detachable cartridge unit 306 is received for controlling the flow and temperature of the water discharged from the outlet 304.

The cartridge unit 306 has a rotatable control spindle 307 with axial splines 308 for detachably mounting a control knob (not shown) for a combined flow and temperature control mechanism described in more detail later.

The cartridge unit 306 has an external screw thread 309 for engagement with a mating internal screw thread of an opening at one end of the body 305 to secure releasably the cartridge unit 306 in the body 306. The cartridge unit 306 carries axially spaced O-rings 310,311 co-operable with an internal wall 312 of the body 305 to define annular outer chambers 313,314.

The inlets 302,303 communicate with the outer chambers 313,314 respectively. The outlet 304 communicates with an annular outlet chamber 315 formed between the cartridge unit 306 of the valve body 305 and is sealed by an O-ring 316.

Each outer chamber 313,314 communicates with an annular inner chamber 317,318 within the cartridge unit 306 via a series of circumferentially spaced slots 319,320 formed in the body of the cartridge unit 306.

The slots 319,320 are axially offset relative to the inlets 302,303 so that water entering the outer chambers 313,314 is distributed around the chambers 313,314 before entering the inner chambers 317,318.

The cartridge unit 306 has a shuttle valve 321 for controlling the relative proportions of hot and cold water admitted to an annular mixing chamber 322 in accordance with user selection of the desired outlet water temperature.

The shuttle valve 321 has a shuttle 323 axially movable between a cold water valve seat 324 and a hot water valve seat 325 to control the relative proportions of hot or cold water admitted to the mixing chamber 322.

The shuttle 323 has an O-ring 326 separating the inner chambers 317,318 and is connected via webs 327 to a temperature overload housing 328 mounted on a wax filled thermostat 329.

The thermostat 329 has an actuator rod 330 that is axially movable in response to expansion/contraction of the wax filler in response to the temperature of the mixed water sensed by a temperature responsive part 329a of the thermostat 329.

The free end of the rod 330 engages a cap 331 received within the housing 328 and biased towards the rod 330 by an overload spring 332 acting between the cap 331 and an abutment collar 333 at the outer end of the housing 328. A return spring 334 acts between an insert 335 screwed into the end of the cartridge body and the cap 331.

The insert 335 carries the hot seat 325 and is axially adjustable to set the axial spacing between the hot seat 325 and the cold seat 324 according to the operating requirements. The host seat 325 is provided by a rubber ring and is resilient as described for the previous embodiment to provide a fluid-tight seal with the shuttle 323 to shut-off the flow of hot water under operating conditions.

The insert 335 is provided with internal axial ribs 345 providing an axial guide for the lower end of the overload housing 328. The thermostat 329 provides an axial guide for the other end of the overload housing 328 and is in turn axially aligned by engagement with the piston 336. In this way, the shuttle 323 is maintained square to the hot and cold seats 324,325 for axial adjustment of the position of the shuttle 323 to vary the relative proportions of hot and cold water admitted to the mixing chamber 322.

The other end of the thermostat 329 remote from the rod 330 is coupled to a piston 336 received in a bore 337 of a drive nut 338. The drive nut 338 threadably engages the control spindle 307 and is located against rotation so that rotation of the control spindle 307 causes axial movement of the drive nut 338.

The lower end of the drive nut 338 is provided with an annular washer 339 co-operable with an annular valve seat 340 provided by an annular flow guide 341 surrounding the temperature responsive part 329a of the thermostat 329.

Rotation of the control spindle 307 in one direction lowers the drive nut 338 to cause the shuttle 323 to engage the hot seat 325 to shut-off the flow of hot water. Further rotation of the control spindle 307 in the same direction causes the thermostat 329 to move relative to the housing 328 to compress the overload spring 332 and return spring 334 until the washer 339 engages the valve seat 340 to cut-off the flow of cold water.

Rotation of the control spindle 307 in the opposite direction moves the washer 339 away from the valve seat 340 to allow flow of cold water with the flow of hot water cut-off until the compression of the over-load spring 332 is taken up. The housing 328 is then coupled for movement with the thermostat 329 via the return spring 334 and further rotation of the control spindle in the same direction moves the shuttle 323 away from the valve seat 325 to allow flow of hot water.

The amount of travel before the shuttle 323 is coupled for movement with the thermostat 329 is pre-set by adjusting the position of the piston 336 via an adjusting screw 342 threadably mounted in a tapped bore 343 of the drive nut 338. The bore 343 extends axially to the outer end of the drive nut 338 for insertion of a tool such as a screwdriver or alien key to adjust the position of the piston 336.

In use, hot and cold water flowing into the annular outer chambers 313,314 is confined to flow around the chambers 313,314 and passes through the slots 319,320 into the inner chambers 317,318. The slots 319,320 are axially offset relative to the valve seats 324,325 so the water flows are evenly distributed around the chambers 317,318 and approach the valve seats 324,325 in an axial direction.

The hot water flows across the valve seat 325 in a radial direction and is turned in an axial direction by a curved surface 328a of the housing 328. The hot water flow also clings to a curved surface 323a of the shuttle 323 due to the Coanda effect that assists flow of the hot water in the axial direction.

The cold water flows across the valve seat 324 in a radial direction and is turned in an axial direction by a curved surface 323b of the shuttle 323. The cold water flow also clings to a curved surface 324a of the seat 324 due to the Coanda effect that assists flow of the cold water in the axial direction.

The shuttle 323 is of short axial length so that both flows meet quickly and are thoroughly mixed in the mixing chamber 322. More particularly, the mixing chamber 115 has a cross-sectional area perpendicular to the direction of flow approximately 1 to 1½ times the combined cross-sectional area of the hot and cold flows into the mixing chamber 115. As a result, turbulent flow conditions are created within the mixing chamber 322 and substantially complete mixing of the hot and cold flows can be achieved if the length of the mixing chamber 322 is approximately 5 times the width.

The mixed water stream flowing over the temperature responsive part 329a of the thermostat 329 within the flow guide 341 is substantially free from any streams of unmixed or partially mixed water. As a result, the thermostat response is enhanced for accurate adjustment of the shuttle 323 to control the relative proportions of hot and cold water admitted to the mixing chamber 322 according to the desired outlet water temperature.

The mixed water exiting from the flow guide 341 flows into the outlet chamber 315 through a series of circumferentially spaced holes 344 in the cartridge unit 306. The water flows from the outlet chamber 315 to the outlet 304 for discharge to the ablutionary appliance.

If the desired temperature of the mixed water increases, the wax filler expands to increase the projecting length of the actuator rod 330. The causes the housing 328 to be displaced axially relative to the thermostat 329 against the biasing of the return spring 334. The housing 328 carries with it the shuttle 323 causing the flow of hot water to be reduced and the flow of cold water to be increased. In this way the relative proportions of hot and cold water admitted to the mixing chamber 322 are adjusted to return the temperature of the mixed water to the selected temperature.

If the temperature of the mixed water exceeds the maximum permitted, for example if the cold water supply fails, expansion of the wax filler causes the shuttle 323 to engage the hot seat 325 to shut-off the flow of hot water. Further elongation of the actuator rod 330 is accommodated by compression of the overload spring 332 to prevent damage to the internal components of the cartridge unit 306.

If the desired temperature of the mixed water decreases, the wax filler contracts and the housing 328 is displaced axially towards the thermostat 329 reducing the projecting length of the rod 330 under the biasing of the return spring 334. As a result, the axial position of the shuttle 323 is adjusted to increase the flow of hot water and reduce the flow of cold water entering the mixing chamber 322 to return the temperature of the mixed water to the selected temperature.

As will be appreciated, each outer chamber 313,314 and associated inner chamber 317,318 forms a two stage plenum chamber for distributing water flows around the shuttle 323. In this way, substantially identical mixing conditions are created around the porting of the shuttle valve 321 that prevent asymmetric flow patterns developing to any appreciable extent as the hot and cold water flows enter the mixing chamber 322.

In addition, the seal faces of the shuttle 323 are maintained square to the hot and cold seats 324,325 by the guide system for the overload housing 328. This further contributes to producing substantially identical mixing conditions around the porting of the shuttle valve 321 to reduce development of asymmetric flow patterns in the water admitted to the mixing chamber 322.

Furthermore, the hot and cold flows are turned in an axial direction towards the mixing chamber 322 which has a small radial width to create turbulent flow that ensures thorough mixing of the flows within a short axial distance. Moreover, the flows are introduced close together and turned in an axial direction so that, if either flow is at a higher pressure, it creates a pressure drop that entrains and assists the other flow to enhance response of the thermostat to a change in the desired temperature of the outlet water.

Figure 19:
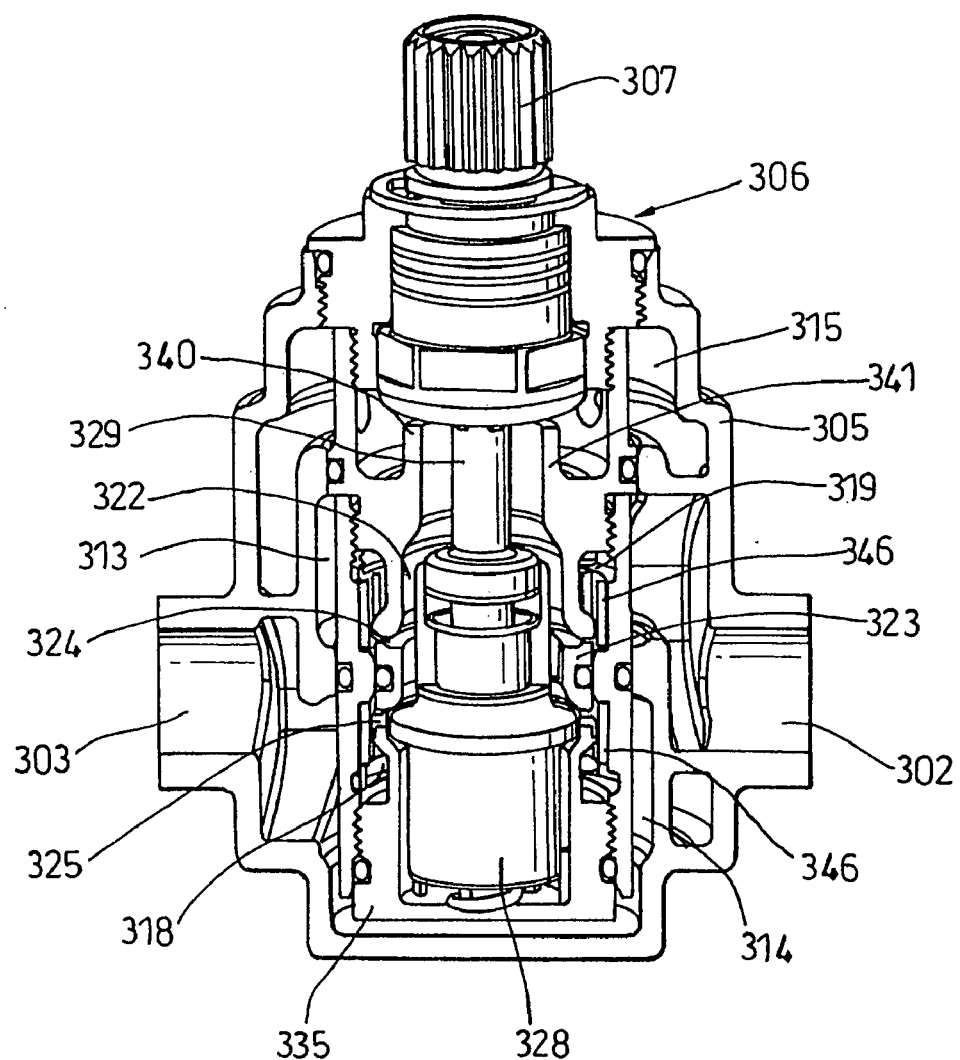
FIG. 19 is an isometric view, partly sectioned, showing a modification to the valve of FIGS. 15 to 18.

Referring now to FIG. 19 of the accompanying drawings, there is shown a modification to the valve shown in FIGS. 14 to 18. For convenience, like reference numerals are used to indicate corresponding parts.

In the modification shown in FIG. 19, the inner chambers 317,318 are provided with a series of axially extending flow guide vanes 346 uniformly spaced apart in a circumferential direction. The guide vanes 346 further assist in confining the water to flow in an axial direction towards the porting of the shuttle valve 321 so that flow across the valve seats 324,325 is radial. In this way swirl flow vectors in the water admitted to the mixing chamber 322 are reduced. It will be understood that flow guide vanes 346 may be provided in the inner chambers of any of the previous embodiments.

Figure 20:
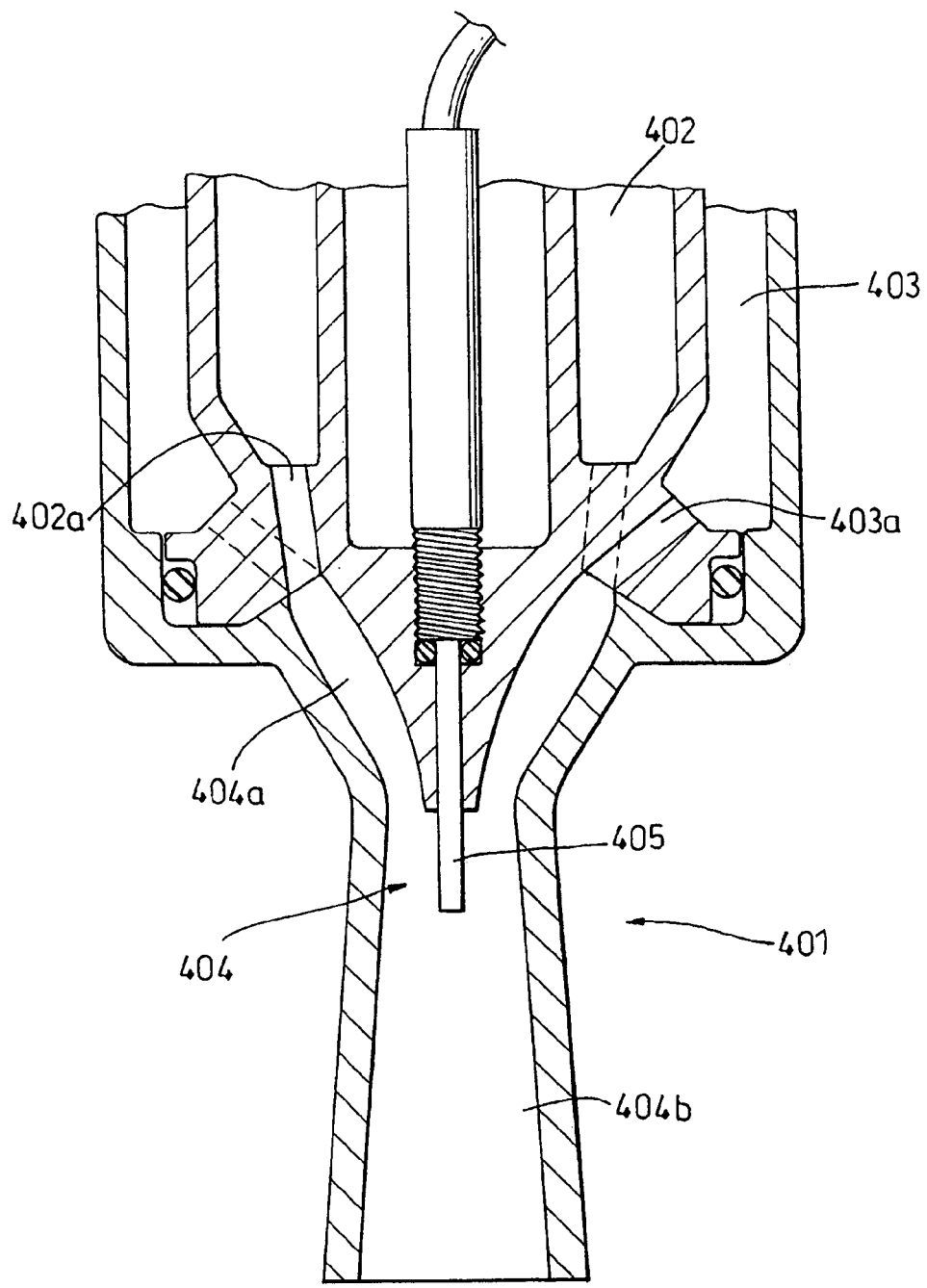
FIG. 20 is a longitudinal section showing part of a thermostatic mixing valve according to a fifth embodiment of the invention.

Referring now to FIG. 20, there is shown part of an electronically controlled thermostatic mixing valve 401 according to a fifth embodiment of the invention. This embodiment provides interlacing of the hot and cold streams to promote mixing in similar manner to the embodiment of FIGS. 5 to 9 but with some advantages compared to the arrangement shown in FIGS. 5 to 9.

As shown the valve 401 has an inner water chamber 402 and a concentric outer water chamber 403. Valve means (not shown) controls the flow of hot water to one of the chambers 402,403 and the flow of cold water to the other chamber 402, 403. The valve means may be of any suitable type to adjust the relative proportions of hot and cold water to control the outlet water temperature in accordance with user selection and to maintain the selected outlet water temperature substantially constant.

For example, the valve device may be a proportioning mechanism such as a shuttle valve or spool valve to adjust the hot and cold flows inversely to each other. Alternatively, the valve device may comprise separate flow control valves for each flow. If separate valves are used, the total flow rate can be controlled by simultaneous adjustment of the valves to increase or reduce both flows while keeping the relative proportions the same to maintain the required outlet water temperature.

Each chamber 402, 403 is provided with a plurality of transfer ports or nozzles 402a, 403a respectively that open into a mixing chamber 404. The mixing chamber 404 has an annular ring shaped inlet portion 404a that leads to a tubular exit portion 404b that opens to an outlet chamber (not shown) for discharge of temperature controlled output water from the valve 401. The exit portion 404b acts in the manner of a diffuser to recover some of the velocity energy in the water.

The chambers 402, 403 allow the flows of hot and cold water to be distributed evenly before entering the mixing chamber 404 via the nozzles 402a, 403a. In this embodiment each chamber 402, 403 is provided with twelve nozzles 402a, 403a uniformly spaced apart in a circumferential direction at one end of the mixing chamber 404 with the nozzles 402a alternating with the nozzles 403a. It will be understood, however that more or fewer nozzles 402a, 403a may be provided.

Arranging the nozzles 402a, 403a alternately causes the incoming flows of hot and cold water to interlace and promote mixing within the mixing chamber 404 assisted by construction of the mixing chamber 404 to keep the flows moving fast so that they are fully turbulent as described previously.

The temperature of the mixed water stream is sensed by means of a temperature sensor 405 and the valve device is operable via an electronic control system (not shown) such as a programmable microprocessor responsive to input of a desired output water temperature and the temperature sensed by the sensor 405 to control the valve device, for example by means of an electric motor, to provide and maintain the selected outlet water temperature.

The temperature sensor 405 has to be sited sufficiently downstream of the junction between the hot and cold streams in order to allow the streams to merge enough for an accurate temperature to be measured. This gives rise to some transport delay due to the time it takes for the water to travel from the junction to the sensor 405. The valve transient response to any change in the input parameters (pressures or temperatures of the inlet water or the set temperature) is significantly affected by the transport delay. Therefore it is desirable that the streams are mixed effectively and quickly.

We believe that the mixing may be substantially complete about 25% along the mixing chamber 404 from the junction of the hot and cold water streams with the rest of the mixing chamber 404 serving as a diffuser to recover some of the velocity energy in the water.

We have found interlacing of the streams of hot and cold water is particularly effective in getting the streams to merge very quickly and enables the temperature sensor 405 to be positioned close to the junction of the hot and cold streams. As a result, the transport delay may be very short allowing any suitable valve device to be used to control the hot and cold water streams.

In this embodiment, the entry nozzles 402a, 403a to the annular mixing chamber 404 can be sited close to one another Consequently the annular inlet portion 404a of the mixing chamber 404 can be of small volume. Also the nozzles 402a, 403a are directed in substantially the same direction so that the streams will entrain one another very effectively.

As a result, we have found that the temperature sensor 405 can be positioned within the mixing chamber 404 closer to the junction between the streams of hot and cold water compared to the embodiment of FIGS. 5 to 9 where the incoming hot and cold streams are arranged on opposite sides of the O-ring separator.

In this embodiment, the nozzles 402a, 403a are arranged around an annular mixing chamber 404. This is a convenient way to provide the arrangement of interlaced nozzles 402a, 403a and keep the volume of the mixing annulus close to the size required to maintain turbulent flow. For example, in this embodiment we may provide nozzles 402a, 403a approximately 3.28 mm in diameter arranged in a circle of mean diameter about 30 mm with the spout 404b about 11.5 mm diameter at the smallest point. It will be understood, however that other configurations could be used that allow the interlacing of hot and cold water streams and that keep the mixing chamber volume small.

In a modification (not shown) to the arrangement of FIG. 20, the chambers 402, 403 could be provided with annular slots that communicate with the mixing chamber 404. Such arrangement also reduces transport delays by bringing the hot and cold flows together quickly within the mixing chamber and allows co-entrainment of the flows to reduce suppression of the flow of the lower energy stream by the higher energy stream.

As will now be appreciated, in each of the above-described embodiments, the hot and cold water flows are effectively managed to produce a fully blended stream of water flowing over the temperature responsive part of the thermal control system that results in improved thermal control of the outlet water temperature. More particularly, the effects of temperature and/or pressure changes of one or both supplies on the desired outlet water temperature are reduced to a level at which they are substantially unnoticed by the user. Furthermore, the size and duration of transient temperature overshoots or undershoots produced by a change in the desired outlet water temperature are also reduced to a level that is not uncomfortable and/or a risk to the user.

While the invention has been described with reference to the best means known to the applicant, it will be understood that the invention is not limited to the exemplary embodiments above-described and is intended to include equivalents to any feature described herein. Moreover, the invention is not intended to be limited to the combination of features described in the exemplary embodiments and that the invention includes any novel feature described herein separately or in combination with any other feature of any of the embodiments. Furthermore, it will be understood that other variations and modifications falling within the spirit and scope of the following claims are also included.

We claim:

1. A thermostatic mixing valve having a hot water inlet for connection to a supply of hot water, a cold water inlet for connection to a supply of cold water, an outlet for temperature controlled water, valve means for controlling the relative proportions of hot and cold water admitted to a mixing chamber, the outlet communicating with the mixing chamber to receive temperature controlled water having a desired temperature, temperature control means for adjusting the valve means in accordance with the desired temperature of the temperature controlled water, each inlet communicating with a respective multi-stage annular plenum chamber constructed and arranged upstream of said valve means to distribute flow of water to porting of the valve means for admitting the water to the mixing chamber, wherein each said multi-stage plenum chamber has an annular outer chamber communicating with the associated inlet and an annular inner chamber communication with said porting, wherein said annular chambers are configured to distribute flow of water to porting of the valve means for admitting the water to the mixing chamber, and wherein water enters and exits each annular chamber at positions axially spaced from each other.

2. A thermostatic mixing valve according to claim 1 wherein each plenum chamber is of similar size and shape so that the distribution of flows is substantially the same.

3. A thermostatic mixing valve according to claim 1 wherein each multi-stage plenum chamber is a two stage plenum chamber in which said annular inner chamber is separated from said annular outer chamber by partition means arranged so that water flows around the outer chamber and into the inner chamber at a position axially spaced from porting of the valve means and from the inlet to the outer chamber.

4. A thermostatic mixing valve according to claim 3 wherein the partition means separating the outer and inner chambers comprises an annular wall provided with at least one opening providing a substantially uniform distribution of the water flow around the inner chamber.

5. A thermostatic mixing valve according to claim 4 wherein the opening is in the form of a continuous annular slot in the wall between the outer and inner chambers.

6. A thermostatic mixing valve according to claim 4 wherein the opening is in the form of a series of slots or holes of uniform size and shape formed in the wall between the outer and inner chambers with a regular spacing between the slots in the circumferential direction.

7. A thermostatic mixing valve according to claim 4 wherein the opening is offset relative to the point at which the water flow enters the outer chamber.

8. A thermostatic mixing valve according to claim 1 wherein the valve means comprises a shuttle valve mounted for axial movement relative to annular hot and cold seats to vary the relative proportions of hot and cold water admitted to the mixing chamber, wherein the hot and cold seats are positioned between opposed annular sealing faces of the shuttle valve for co-operating with the hot and cold seats.

9. A thermostatic mixing valve according to claim 8 wherein the hot and cold seats are provided by opposite sides of a thin, annular seating member such that the hot and cold flows enter the mixing chamber at substantially the same axial position.

10. A thermostatic mixing valve according to claim 8 wherein guide means is provided to maintain the sealing faces square relative to the valve seats.

11. A thermostatic mixing valve according to claim 1 wherein the valve means comprises a spool valve mounted for axial movement relative to an annular flow separator to vary the relative proportions of hot and cold water admitted to the mixing chamber, the spool valve comprising a cylindrical shuttle axially movable relative to an O-ring to vary the area of axially extending slots in the shuttle to the flows of hot and cold water, wherein the slots are inclined to the longitudinal axis of the shuttle so that the flows of hot and cold water are offset in the circumferential direction.

12. A thermostatic mixing valve according to claim 1 wherein the mixing chamber is arranged so that incoming streams of hot and cold water are turned to flow in the same direction such that flow of the hot stream entrains and assists flow of the cold stream.

13. A thermostatic mixing valve according to claim 1 wherein the mixing chamber has a cross-sectional area relative to the combined cross-sectional areas of the hot and cold flows such that the velocity energy of the hot and cold flows is sufficient to create turbulent flow conditions within the mixing chamber.

14. A thermostatic mixing valve according to claim 1 wherein the cross-sectional area of the mixing chamber is from 1 to 1.5 times the combined cross-sectional areas of the hot and cold flows and the axial length of the mixing chamber is at least 5 times the width of the mixing chamber.

15. A thermostatic mixing valve according to claim 1 wherein the mixing chamber is sized to match the total flow through the valve.

16. A thermostatic mixing valve according to claim 1 wherein each of the flows of hot and cold water is admitted to the mixing chamber at a plurality of openings with the hot flow openings being offset relative to the cold flow openings so that the flows of hot and cold water interlace.

17. A thermostatic mixing valve according to claim 16 wherein the hot flow openings alternate with the cold flow openings in the circumferential direction.

18. A thermostatic mixing valve according to claim 1 wherein flow control valves are provided between the inlets and each plenum chamber and are linked for operation simultaneously by a common control member for controlling the flows of hot and cold water separate from the temperature control.

19. A thermostatic mixing valve according to claim 1 wherein the temperature control and flow control are linked to control the flows of hot and cold water in sequence whereby the cold water flow is turned on first during start-up and the hot water flow is turned off first during close-down.

20. A thermostatic mixing valve according to claim 3 wherein the valve comprises a main body having the inlets for connection to the hot and cold supplies and the outlet for connection to an ablutionary appliance and an opening for reception of a cartridge unit housing the valve means, wherein the outer chamber of each plenum chamber is defined between the valve body and the cartridge unit with the inner chamber being formed inside the cartridge unit and communicating with the outer chamber via at least one opening in the wall of the cartridge unit.

21. A thermostatic mixing valve for hot and cold water has inlets for the hot and cold water flows respectively, each said inlet communicating with a respective multi-stage annular inlet chamber, valve means for controlling the relative proportions of hot and cold water admitted from each said multi-stage annular inlet chamber to a mixing chamber, each said multi-stage annular inlet chamber being arranged upstream of porting of said valve means to distribute the flow from the associated inlet uniformly with respect to said porting for admitting the flow to said mixing chamber to reduce asymmetric flow patterns and promote thorough mixing of the flows within said mixing chamber, wherein each said multi-stage inlet chamber has an annular outer chamber communicating with the associated inlet, an annular inner chamber associated with said porting, and at least one opening for water to enter said inner chamber from said outer chamber, said at least one opening being axially spaced from said porting and from said inlet to said outer chamber.

22. A method of reducing asymmetric flow patterns and promoting thorough mixing of flows of hot and cold water within a mixing chamber of a thermostatic mixing valve comprises providing valve means for controlling the relative proportions of hot and cold water admitted to a mixing chamber, providing multi-stage annular inlet chambers upstream of said valve means for the hot and cold water flows respectively, and arranging each said multi-stage inlet chamber such that water enters and exits each annular stage of said multi-stage inlet chamber at positions axially spaced from each other so as to distribute the flow uniformly to porting of said valve means for admitting the flow to said mixing chamber.

* * * * *